(12) United States Patent
Aldhaher et al.

(10) Patent No.: US 11,728,695 B2
(45) Date of Patent: Aug. 15, 2023

(54) ALIGNMENT DEVICE FOR ALIGNING TRANSMITTER AND RECEIVER OF WIRELESS POWER TRANSFER SYSTEM, AND METHOD THEREFOR

(71) Applicant: Solace Power Inc., Mount Pearl (CA)

(72) Inventors: Samer Aldhaher, Mount Pearl (CA); Rodney Winsor, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 0 days.

(21) Appl. No.: 17/083,735

(22) Filed: Oct. 29, 2020

(65) Prior Publication Data
US 2021/0126494 A1 Apr. 29, 2021

Related U.S. Application Data

(60) Provisional application No. 62/927,224, filed on Oct. 29, 2019.

(51) Int. Cl.
*H02J 50/90* (2016.01)
*H02J 50/80* (2016.01)
*H02J 50/12* (2016.01)

(52) U.S. Cl.
CPC ............ *H02J 50/90* (2016.02); *H02J 50/12* (2016.02); *H02J 50/80* (2016.02)

(58) Field of Classification Search
CPC ............ H02J 50/90; H02J 50/80; H02J 50/12
USPC .......................................................... 307/104
See application file for complete search history.

(56) References Cited

U.S. PATENT DOCUMENTS

| | | | |
|---|---|---|---|
| 9,409,490 B2* | 8/2016 | Kawashima | H02J 7/00034 |
| 2013/0021168 A1* | 1/2013 | Jones | H02J 50/80 |
| | | | 324/226 |
| 2013/0024059 A1* | 1/2013 | Miller | B60L 53/30 |
| | | | 320/108 |
| 2014/0015328 A1* | 1/2014 | Beaver | H02J 7/34 |
| | | | 307/104 |
| 2015/0022142 A1* | 1/2015 | Garcia Briz | H02J 50/12 |
| | | | 320/108 |
| 2015/0077046 A1* | 3/2015 | Huang | B60L 53/38 |
| | | | 320/108 |
| 2015/0094887 A1* | 4/2015 | Kawashima | H02J 50/60 |
| | | | 320/108 |
| 2015/0202970 A1* | 7/2015 | Huang | B60L 53/12 |
| | | | 320/108 |
| 2015/0255205 A1* | 9/2015 | Islinger | H02J 50/12 |
| | | | 336/92 |
| 2019/0118657 A1* | 4/2019 | Wang | H02J 50/10 |

\* cited by examiner

*Primary Examiner* — Alfonso Perez Borroto
(74) *Attorney, Agent, or Firm* — Harness, Dickey & Pierce, P.L.C.

(57) ABSTRACT

An alignment device comprises a coil configured to generate an induced voltage from a magnetic field, or an electrode configured to generate an induced voltage from an electric field. The alignment device further comprises a comparator configured to compare the induced voltage to a threshold voltage and activate an indicator based on the comparison.

17 Claims, 17 Drawing Sheets

ALIGNMENT DEVICE FOR ALIGNING TRANSMITTER AND RECEIVER OF WIRELESS POWER TRANSFER SYSTEM, AND METHOD THEREFOR

CROSS-REFERENCE TO RELATED APPLICATION

The subject application claims the benefit of U.S. Provisional Application No. 62/927,224 filed on Oct. 29, 2019, the entire content of which is incorporated herein by reference.

FIELD

The subject disclosure relates generally to wireless power transfer and in particular, to an alignment device for aligning a transmitter and receiver of a wireless power transfer system, and a method therefor.

BACKGROUND

Wireless charging and wireless power transfer systems are becoming an increasingly important technology to enable the next generation of devices. The potential benefits and advantages offered by the technology is evident by the increasing number of manufacturers and companies investing in the technology.

A variety of wireless power transfer systems are known. A typical wireless power transfer system includes a power source electrically connected to a wireless power transmitter, and a wireless power receiver electrically connected to a load.

In magnetic induction systems, the transmitter has a coil with a certain inductance that transfers electrical energy from the power source to a receiving coil with a certain inductance. Power transfer occurs due to coupling of magnetic fields between the inductors of the transmitter and receiver. The range of these magnetic induction systems is limited, and the inductors of the transmitter and receiver must be tightly coupled, i.e. have a coupling factor above 0.5 and be in optimal alignment for efficient power transfer.

There also exist resonant magnetic systems in which power is transferred due to coupling of magnetic fields between the inductors of the transmitter and receiver. The transmitter and receiver inductors are loosely coupled, i.e. have a coupling factor below 0.5. In resonant magnetic systems the inductors are resonated using at least one capacitor. In resonant magnetic systems, the transmitter is self-resonant and the receiver is self-resonant. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric capacitive or resonant electric capacitive (electric fields).

The Qi wireless charging standard is an exemplary implementation of a magnetic induction system. The Qi wireless charging standard is used in low power consumer electronics such as smart phones and wearable devices. Furthermore, low cost power converters, coils and integrated circuits are available for use in the Qi wireless charging standard. The Qi wireless charging standard operates in the kHz frequency range. Accordingly, devices operating according to the Qi wireless charging standard have limited coupling range, require precise coil alignment and use ferrite-based coils, which can be heavy and fragile. Consequently, the application scope of the Qi wireless charging standard is limited.

In electrical capacitive systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. In resonant electric systems, the transmitter is self-resonant and the receiver is self-resonant. Resonant electric systems have an increased range of power transfer compared to that of electric capacitive systems and alignment issues are rectified. While electromagnetic energy is produced in electric capacitive and resonant electric systems, the majority of power transfer occurs via the electric field. Little, if any, power is transferred via magnetic induction or resonant magnetic induction.

Although wireless power transfer techniques are known, improvements are desired.

SUMMARY

It should be appreciated that this Summary is provided to introduce a selection of concepts in a simplified form that are further described below in the Detailed Description of Embodiments. This Summary is not intended to be used to limit the scope of the claimed subject matter.

Accordingly, in one aspect there is provided an alignment device comprising: a coil configured to generate an induced voltage from a magnetic field, or an electrode configured to generate an induced voltage from an electric field; and a comparator configured to compare the induced voltage to a threshold voltage and activate an indicator based on the comparison.

In one or more embodiments, the induced voltage is proportional to the strength of the magnetic field intersecting the coil, or to the electric field intersecting the electrode.

In one or more embodiments, the alignment device is configured to align a transmitter and a receiver for optimal power transfer efficiency.

In one or more embodiments, the alignment device is configured to align a transmitter coil and a receiver coil for optimal power transfer efficiency.

In one or more embodiments, the alignment device is configured for use with a high frequency wireless power transfer system.

In one or more embodiments, the coil or electrode forms part of a field detection unit (FDU).

In one or more embodiments, the FDU comprises at least one tuning capacitor configured to tune the coil.

In one or more embodiments, the FDU comprises a rectifier configured to rectify the induced voltage from alternating current (AC) to direct current (DC).

In one or more embodiments, the FDU comprises at least one diode configured to add capacitors to the coil to decrease a resonant frequency of the coil In one or more embodiments, the alignment device comprises a plurality of FDUs, each FDU comprising an individual coil configured to generate an induced voltage from a magnetic field, or an individual electrode configured to generate an induced voltage from an electric field.

In one or more embodiments, the alignment device comprises four FDUs orthogonally positioned with respect to each other in a plane.

In one or more embodiments, the FDUs are positioned equidistant to each other in the plane.

In one or more embodiments, the alignment device comprises five FDUs orthogonally positioned with respect to each other in a plane.

In one or more embodiments, four FDUs are positioned equidistant to a central FDU in the plane.

In one or more embodiments, each FDU is associated with an individual indicator.

In one or more embodiments, the comparator forms part of a main board.

In one or more embodiments, the main board further comprises the indicator.

In one or more embodiments, the main board further comprises a voltage divider configured to scale down voltage.

In one or more embodiments, the main board further comprises a sensitivity control configured to control the threshold voltage.

In one or more embodiments, the alignment device further comprises a spirit level.

According to another aspect there is provided an alignment device for determining an optimal alignment of a transmitter and a receiver configured to extract power from the transmitter via magnetic field coupling or electric field coupling.

In one or more embodiments, the alignment device comprises a coil configured to generate an induced voltage from a magnetic field.

In one or more embodiments, the alignment device comprises an electrode configured to generate an induced voltage from an electric field.

In one or more embodiments, the alignment device comprises an indicator configured to activate based on a comparison between the induced voltage and a threshold voltage.

In one or more embodiments, the alignment device further comprises a comparator configured to compare the induced voltage to the threshold voltage.

In one or more embodiments, the alignment device comprises any of the features or elements of the described alignment devices.

According to another aspect there is provided, a method comprising:
a) activating a transmitter positioned on one side of a material;
b) positioning an alignment device on another side of the material opposite the transmitter;
c) generating, via a coil of the alignment device, an induced voltage from a magnetic field generated by the transmitter, or generating, via an electrode of the alignment device, an induced voltage from an electric field generated by the transmitter;
d) activating an indicator of the alignment device based on a comparison of the induced voltage with a threshold voltage;
e) repositioning the alignment device relative to the transmitter; and
f) repeating steps c) to e) until optimal power transfer efficiency between the transmitter and the alignment device is obtained.

In one or more embodiments, the method further comprises positioning a receiver at a position at which optimal power transfer efficiency between the transmitter and the alignment device is obtained.

In one or more embodiments, the alignment device of the method comprises any of the described alignment devices.

BRIEF DESCRIPTION OF THE DRAWINGS

Embodiments will now be described more fully with reference to the accompanying drawings in which.

DETAILED DESCRIPTION OF EMBODIMENTS

Figure 1:
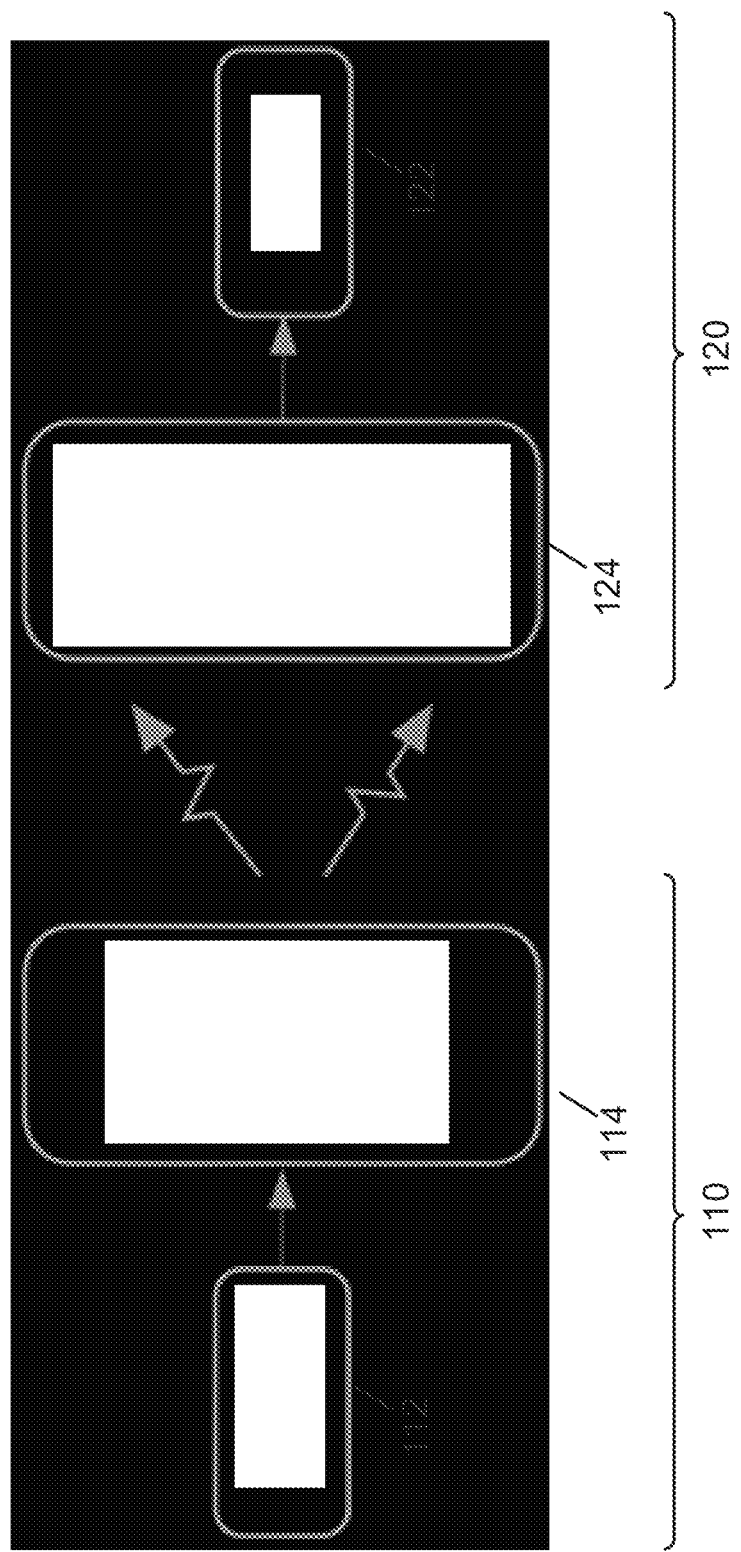
FIG. 1 is a block diagram of a wireless power transfer system.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject disclosure that elements, components, and/or other subject matter that are described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being "on," "attached" to, "connected" to, "coupled" with, "contacting," etc., another element, it can be directly on, attached to, connected to, coupled with or contacting the other element or intervening elements may also be present.

It should be understood that use of the word "exemplary", unless otherwise stated, means 'by way of example' or 'one example', rather than meaning a preferred or optimal design or implementation.

Unless defined otherwise, all technical and scientific terms used herein have the same meaning as is commonly understood by one of skill in the art to which the subject disclosure pertains.

As used herein, the terms "approximately", "about", "approximately", "generally" etc. represent an amount or condition close to the stated amount or condition that still performs the desired function or achieves the desired result. For example, the terms "approximately", "about", "approximately", "generally" etc. may refer to an amount or condition that is within engineering tolerances that would be readily appreciated by a person skilled in the art.

Turning now to FIG. 1, a wireless power transfer system generally identified by reference numeral 100 is shown. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is then transferred from the transmit element 114 to the receive element 124 via resonant or non-resonant electric or magnetic field coupling. The power is then transferred from the receive element 124 to the load 122. Exemplary wireless power transfer systems 100 include a high frequency inductive wireless power transfer system as described in U.S. patent application Ser. No. 17/018,328, the relevant portions of which are incorporated herein.

Figure 2:
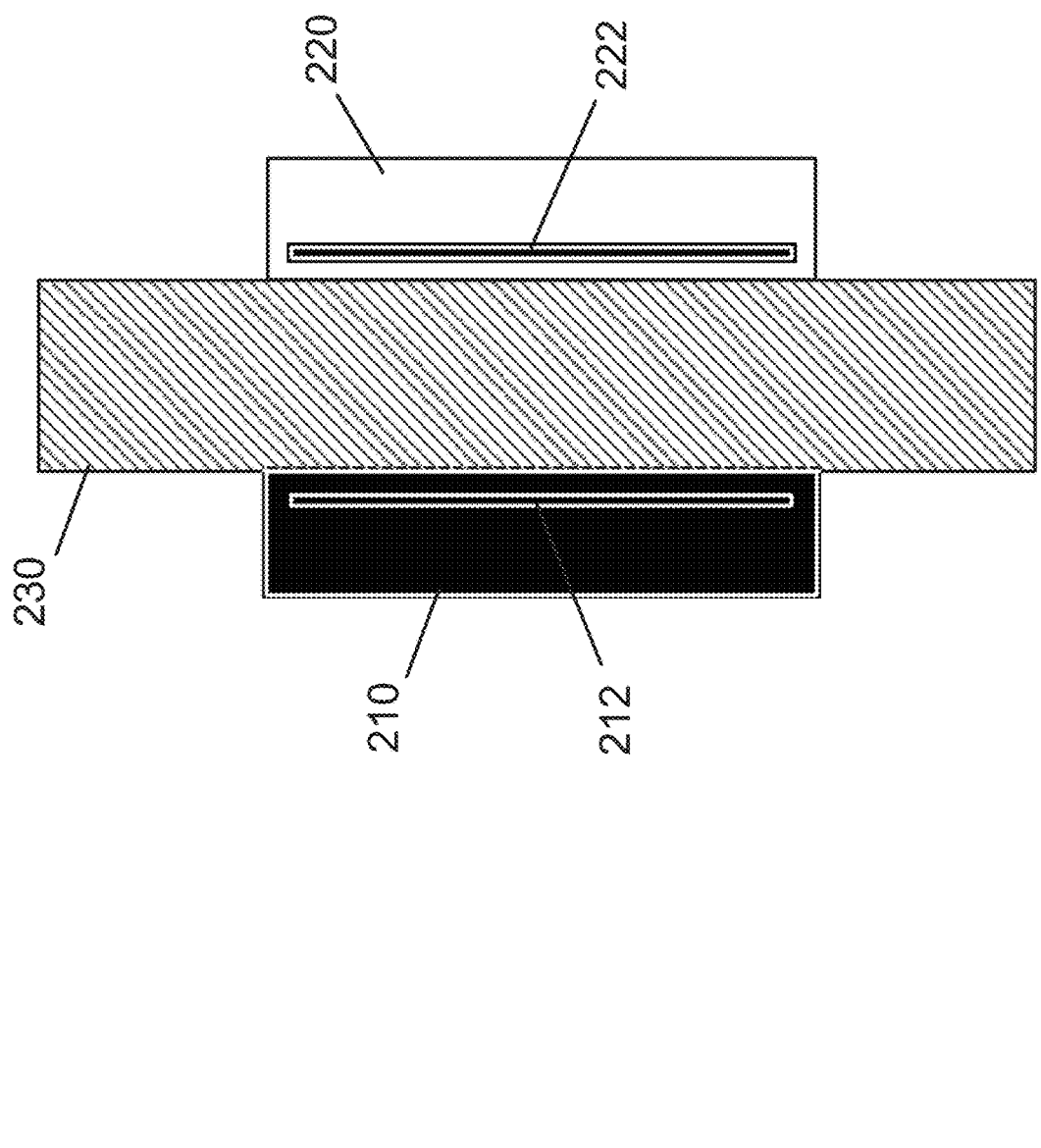
FIG. 2 is a block diagram of a transmitter and receiver of a high frequency wireless power transfer system mounted to a material.

Turning now to FIG. 2, another exemplary wireless power transfer system is shown. In this embodiment, the wireless power transfer system is a high frequency wireless power transfer system 200 as described in the above-incorporated '328 application. In this embodiment, the high frequency wireless power transfer system 200 is an inductive system. One of reasonable skill in the art will appreciate that the high frequency wireless power transfer system 200 may be configured to transfer power via high frequency magnetic inductive coupling or high frequency electric capacitive coupling. In magnetic inductive coupling systems, the majority of power transfer occurs via the magnetic field. Little, if any, power is transferred via electric capacitive or resonant electric capacitive (electric fields). In electric capacitive coupling systems, the majority of power transfer occurs via the electric field. Little, if any, power is transferred via magnetic inductive or resonant magnetic induction.

In this embodiment, the high frequency wireless power transfer system 200 is configured to transfer power via high frequency magnetic field coupling. The high frequency wireless power transfer system 200 comprises a transmitter 210 configured to operate at a given frequency, and a receiver 220 configured to operate at the operational frequency of the transmitter 210. As shown in FIG. 2, the transmitter 210 is positioned on a material 230. The material 230 is fabricated from any type of suitable material or material combination that is not conductive or magnetic, e.g. wood, glass, stone, brick, concrete, plastic, except for materials or a combination of materials that would cause termination of the fields prematurely, i.e. act as a shield. In this embodiment, the material 230 forms part of a wall. The receiver 220 is positioned on the opposite side of the material 230, such that the material 230 is directly between the transmitter 210 and receiver 220. One of reasonable skill in the art will recognize that more than one transmitter 210 and receiver 220 is possible.

In this embodiment, the transmitter 210 comprises a transmitter coil 212, and the receiver 220 comprises a receiver coil 222. One of skill in the art will recognize that more than one transmitter coil 212 and receiver coil 222 is possible.

The transmitter 210 operates in current-mode output (constant current output). In current-mode output, the transmitter 210 is configured to generate a magnetic field without the requirement for a receiver 220 to be present near the transmitter 210.

Generally, current-mode output high frequency wireless power transfer systems differ from voltage-mode output (constant voltage output) high frequency wireless power transfer systems in that voltage-mode output transmitters 210 cannot generate and maintain a magnetic field without a receiver 220 present near the transmitter 210. If a receiver 220 is not present in a voltage-mode output high frequency wireless power transfer system, the transmitter 210 will essentially operate in a short-circuit condition, and therefore cannot sustain generation of a magnetic field.

Power transfer from transmitter 210 to receiver 220 occurs through the material 230. In order to maximize the coupling coefficient value and the highest power transfer efficiency, the transmitter 210 and receiver 220 should be optimally aligned. If the material 230 is opaque or if it completely obstructs view of the position of either the transmitter 210 or receiver 220, or both, it may be problematic to optimally align the transmitter 210 and receiver 220.

In optimal alignment of the receiver 220 with the transmitter 210, the receiver coil 222 is in optimal alignment with the transmitter coil 212.

Figure 3:
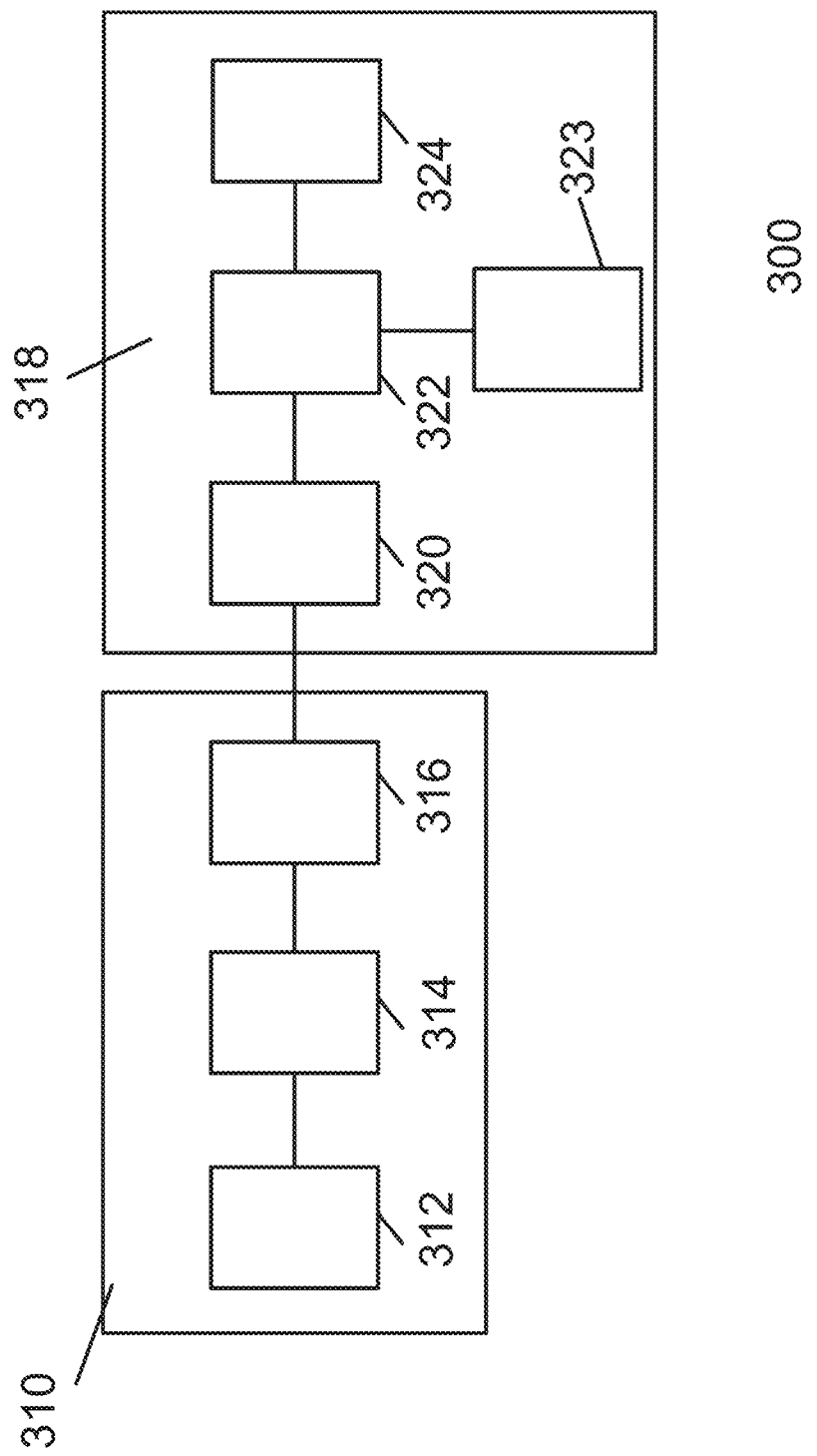
FIG. 3 is block diagram of an alignment device in accordance with an aspect of the subject disclosure.

Turning now to FIG. 3, a block diagram of an alignment device 300 in accordance with an aspect of the subject disclosure is shown. Given a certain fixed distance away from the transmitter 210, the alignment device 300 determines the position at which, when a receiver 220 is installed, the transmitter 210 and receiver 220 will be in optimal alignment to achieve the maximum coupling coefficient value and hence, the highest power transfer efficiency. The transmitter coil 212 and receiver coil 222 are in optimal alignment when their centre axes normal to the transmitter coil 212 and the receiver coil 222 are collinear. The centre axis of each of the transmitter coil 212 and the receiver coil 222 is the axis extending through the centre of mass of the respective coil 212 and 222.

In particular, the alignment device 300 is configured to generate an induced voltage from a magnetic field generated by the transmitter 210. Specifically, the alignment device 300 is configured to generate an induced alternating voltage when intersected by the alternating magnetic field generated by the transmitter 210. Based on the induced alternating voltage, the alignment device 300 is configured to determine the position of the alignment device 300 in relation to the transmitter 210 or transmitter coil 212. The receiver 220 and receiver coil 222 may then be positioned in the position in which power transfer efficiency is maximized between the transmitter and receiver coils 212 and 222 as determined by the alignment device 300.

The alignment device 300 comprises a field detection unit (FDU) 310 and a main board 318. The FDU 310 comprises at least one coil 312, at least one tuning capacitor 314 and a rectifier 316. The coil 312 is electrically connected to the tuning capacitor 314. The tuning capacitor 314 is electrically connected to the coil 312 and the rectifier 316. The FDU 310 is electrically connected to the main board 318. Specifically, the rectifier 316 of the FDU 310 is electrically connected to a voltage divider 320 of the main board 318. The main board 318 comprises the voltage divider 320, a comparator, which in this embodiment takes the form of a comparator circuit 322, a sensitivity control 323 and an indicator 324. The voltage divider 320 is electrically connected to the rectifier 316 of the FDU 310. The voltage divider 320 is also electrically connected to the comparator circuit 322. The comparator circuit 322 is electrically connected to the indicator 324 via a driving circuit (not shown). The indicator 324 is electrically connected to the comparator circuit 322 via a driving circuit (not shown).

The comparator circuit 322 is configured to compare a voltage signal of the rectifier 316 against a preset threshold voltage. In this embodiment, the indicator 324 associated with the FDU 310 is a light emitting diode (LED). The LED is driven by an LED driving circuit (not shown). The LED driving circuit, which, in this embodiment, comprises a transistor (not shown), is triggered by output from the comparator circuit 322. The sensitivity control 323 is electrically connected to the comparator circuit 322. The sensitivity control 323 is configured to adjust and set a threshold voltage. In this embodiment, the sensitivity control 323 is a turnable knob, dial or the like.

The indicator 324 assists in determining the optimal alignment position at which the maximum coupling coefficient and the highest wireless power transfer efficiency is achieved. For example, the indicator 324 comprises a visual indicator, including, but not limited to, an LED or other type of light/diode; an audible indicator; any type of sensory indicator, including but not limited to, vibration; and any combination of available types of indicators 324, not limited to the types of indicators described herein.

One of reasonable skill in the art will recognize that multiple FDUs 310 may be attached to a single main board 318. Furthermore, one of reasonable skill in the art will appreciate that multiple indicators 324 on a single main board 318 are also possible. For example, one indicator 324 for each FDU 310 may be provided.

In this embodiment, the alignment device 300 is configured for use with the high frequency inductive wireless power transfer system as described in the above-incorporated '328 application. In this embodiment, the alignment device 300 is configured to operate with the current-mode output transmitter 210, both independent from, and in the absence of the receiver 220.

In a voltage-mode output high frequency wireless power transfer system, the alignment device 300 cannot be used without the receiver 220 present. Accordingly, in voltage-mode output high frequency wireless power transfer systems, the alignment device 300 is integrated into the receiver 220. Conversely, the current-mode output high frequency wireless power transfer system 200 will allow the alignment device 300 to operate while being physically separate from the receiver 220, (i.e. decoupled, from the receiver 220), and therefore, allowing the alignment device 300 to operate independently with the transmitter 210, in the complete absence of the receiver 220. As one of reasonable skill in the art will appreciate, the alignment device 300 may alternatively be integrated into the receiver 220 of a current-mode output high frequency wireless power transfer system.

Figure 4:
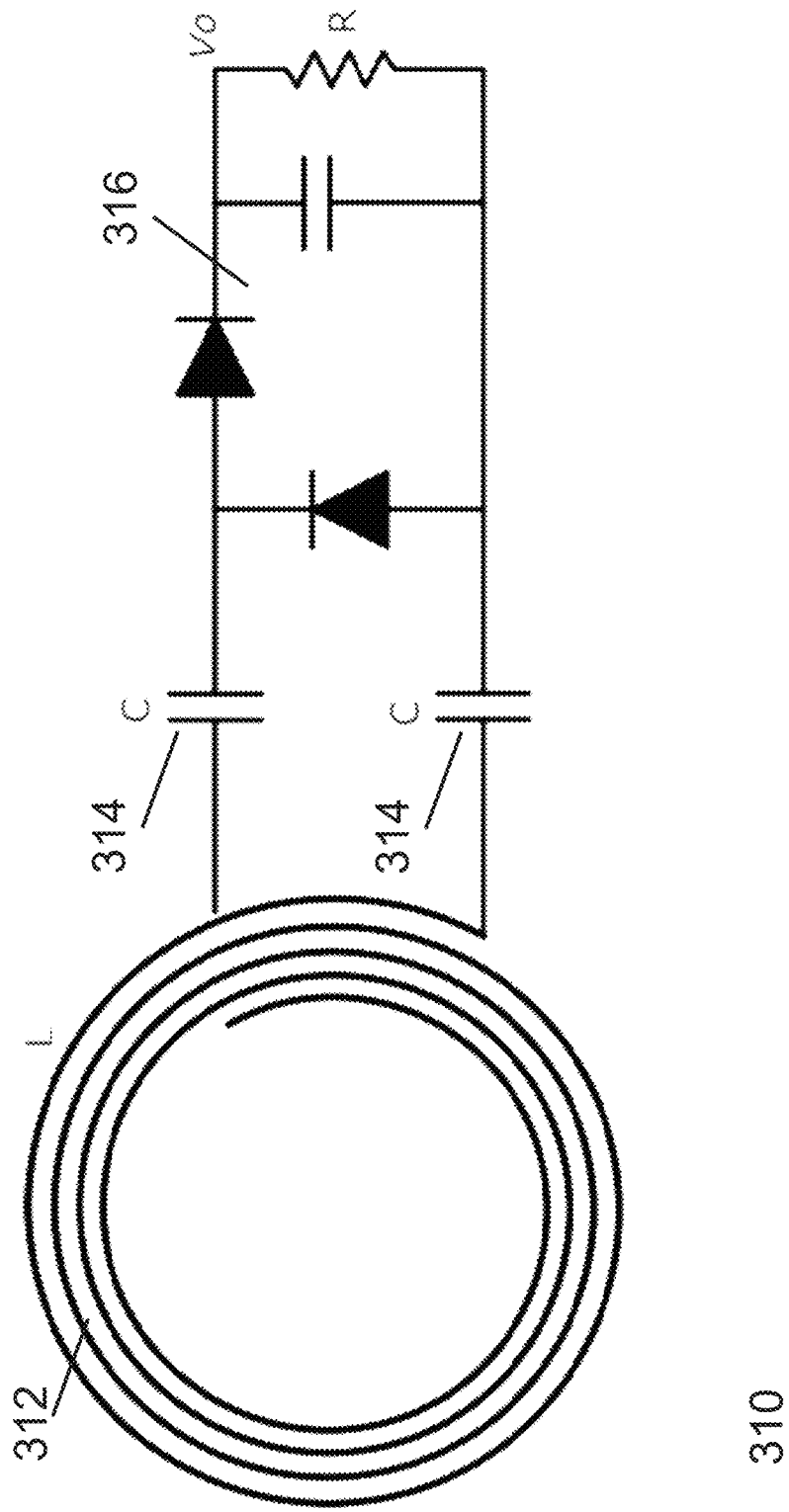
FIG. 4 is a partial schematic layout of a field detection unit (FDU) of the alignment device of FIG. 3.

Turning now to FIG. 4, the FDU 310 of the alignment device 300 is further illustrated. As previously stated, the FDU 310 comprises at least one coil 312. The coil 312 is electrically connected in series to tuning capacitors 314. The tuning capacitors 314 are electrically connected to the coil 312 and to the rectifier 316. The combination of the electrically connected coil 312, tuning capacitors 314 and rectifier 316 forms the FDU 310. The FDU 310 is electrically connected to the main board 318. In this embodiment, the alignment device 300 comprises a single FDU 310. In another embodiment, the alignment device 300 comprises multiple FDUs 310, for example, four FDUs 310. Each FDU 310 is identical.

Figure 5:
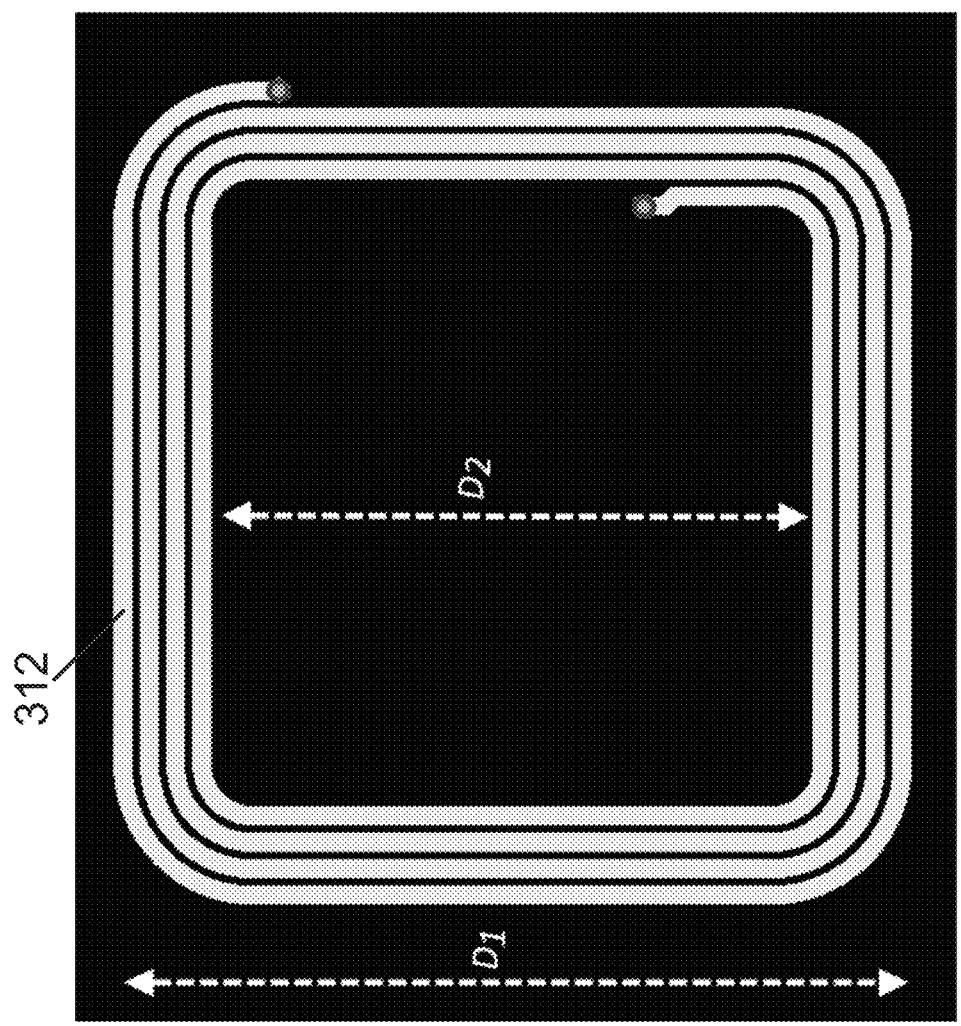
FIG. 5 is a plan view of a coil of the FDU of FIG. 4.

Turning now to FIG. 5, the coil 312 is further illustrated. In this embodiment, the coil 312 is implemented on a printed circuit board (PCB) made of FR4 PCB material. In this embodiment, the coil 312 is a planar coil consisting of multiple turns and is in the approximate shape of a square. In this embodiment, the total number of turns of the coil 312 is four, each turn is 1 mm thick, and the spacing between each turn is 0.3 mm. One of reasonable skill in the art will recognize that the coil 312 could be any other shape, such as, but not limited to, spiral, circular, hexagonal or octagonal. One of reasonable skill in the art will also recognize that the number of turns, the turn thickness and the spacing between the turns could be any suitable value. In this embodiment, the coil 312 has an outer width and height, D1, which is 39 mm, and inner width and height, D2, which is 29.5 mm. One of reasonable skill in the art will recognize that the dimensions D1 and D2 of the coil 312 could be any suitable value. In this embodiment, the inductance (L) of the coil 312 is 1.2 uH. One of reasonable skill in the art will recognize that the inductance of the coil 312 is exemplary. The inductance may be as high as 6 to 8 uH. Generally, the inductance of the coil 312 is bound by the resonant frequency of the transmitter coil 212. Increasing the inductance of the coil 312 will decrease the self-resonant frequency of the coil 312 such that the self-resonant frequency of the coil 312 approaches the resonant frequency, which may be problematic. A higher inductance may however, provide higher sensitivity and field detection during operation of the alignment device 300.

The optimal placement of the alignment device 300 coincides with the optimal alignment of the receiver 220 in relation to the transmitter 210. Optimal alignment of the transmitter 210 and the receiver 220 coincides with optimal alignment of the transmitter coil 212 and the receiver coil 222. Optimal alignment of the transmitter coil 212 and the receiver coil 222 is the position at which the maximum coupling coefficient value and the highest wireless power transfer efficiency is achieved.

During operation, the transmitter 210 of the wireless power transfer system 200 is activated and powered on. The transmitter coil 212 generates a constant alternating current (AC) magnetic field. The receiver 220 can be aligned with the transmitter 210 to allow for power to be transferred wirelessly from the transmitter coil 212 to the receiver coil 222. For alignment to be optimal between the transmitter 210 and the receiver 220, the transmitter coil and 212 the receiver coil 222 must be in optimal alignment. Coupling and power transfer can still occur without optimal alignment of the transmitter coil 202 and receiver coil 212; however, the performance of the wireless power transfer system 200 will be degraded.

As previously stated, given a certain fixed distance away from the transmitter 210, the alignment device 300 determines the position at which, when the receiver 220 is installed, the transmitter 210 and receiver 220 will be in optimal alignment to achieve the maximum coupling coefficient value and hence, the highest power transfer efficiency. The transmitter coil 212 and receiver coil 222 are in optimal alignment when their centre axes normal to the transmitter coil 212 and the receiver coil 222 are collinear. In other words, the transmitter coil 212 and receiver coil 222 are in optimal alignment when the axis extending through the centre of mass of the respective coil 212 and 222 are collinear.

During operation of the alignment device 300, the coil 312 is intersected by an AC magnetic field generated by the transmitter coil 212. The coil 312 generates an induced alternating voltage from the AC magnetic field. The induced voltage is used to determine the position of the alignment device 300 in relation to the transmitter 210 of the high frequency wireless power transfer system 200 that operates at constant-current mode in the transmitter coil 212.

Specifically, the tuning capacitors 314 of the FDU 310 tune the coil 312 to the resonant frequency of the transmitter coil 212 to generate an induced voltage from the AC magnetic field. The coil 312 induces an alternating voltage from the AC magnetic field and outputs an AC voltage signal. The induced alternating voltage is proportional to the strength of the AC magnetic field. The AC voltage signal is passed from the coil 312 to the rectifier 316. The rectifier 316 rectifies the voltage signal from AC to DC. The DC voltage signal is then passed to the main board 318. The voltage divider 320 scales down the DC voltage signal such that the DC voltage signal is compatible with the logic levels of the main board 318. In this embodiment, the scale down factor of the voltage divider 320 is 10. However, one of reasonable skill in the art will recognize that the scale-down factor could be any other suitable value depending on the design of the main board 318. Specifically, the voltage divider 320 scales down the DC voltage so that the DC voltage signal may be compared by the comparator circuit 322. The scaled down DC voltage is measured by the comparator circuit 322. The comparator circuit 322 compares the scaled down DC voltage to the preset threshold voltage as provided by the sensitivity control 323. When the voltage is highest, (i.e. exceeds the threshold set by the sensitivity control 323 in the comparator circuit 322), optimal alignment (or near-optimal alignment) is achieved. The comparator circuit 322 passes the results of the comparison to the indicator 324. The scaled down DC voltage/preset threshold voltage comparison determines to switch on the indicator 324 or not. Specifically, the comparison determines whether the LED of the indicator 324 is switched on or not. The indicator 324 indicates whether optimal alignment has been achieved.

The alignment device 300 allows for the transmitter 210 and receiver 220 to be located on opposite sides of material 230, such as a wall or window. The alignment device 300 allows the optimal position of the transmitter coil 212 and receiver coil 222 to be determined, and therefore achieves the maximum coupling coefficient value and the highest wireless power transfer efficiency through the material 230.

Figure 6:
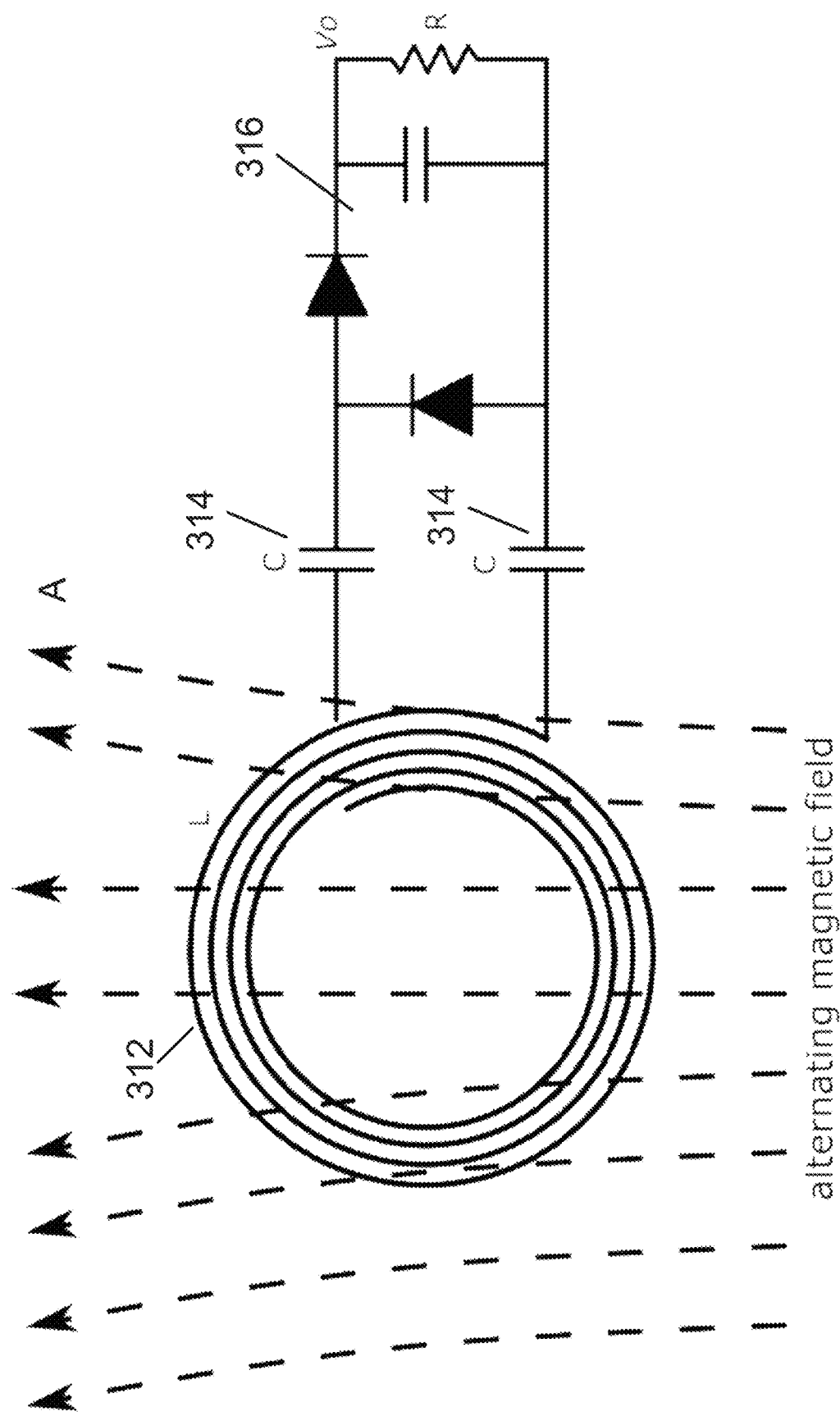
FIG. 6 is a partial schematic layout of the FDU of FIG. 4 with an alternating magnetic field present during operation.

As shown in FIG. 6, during operation of the alignment device 300, the coil 312 is subjected to an AC magnetic field in the direction indicated by arrows A. When subjected to the AC magnetic field, the coil 312 is intersected by the alternating magnetic field. The AC magnetic field that intersects the coil 312 induces an alternating voltage in the coil 312. FIG. 6 shows an example of the direction of the magnetic field lines in relation to the coil 312.

Figure 7:
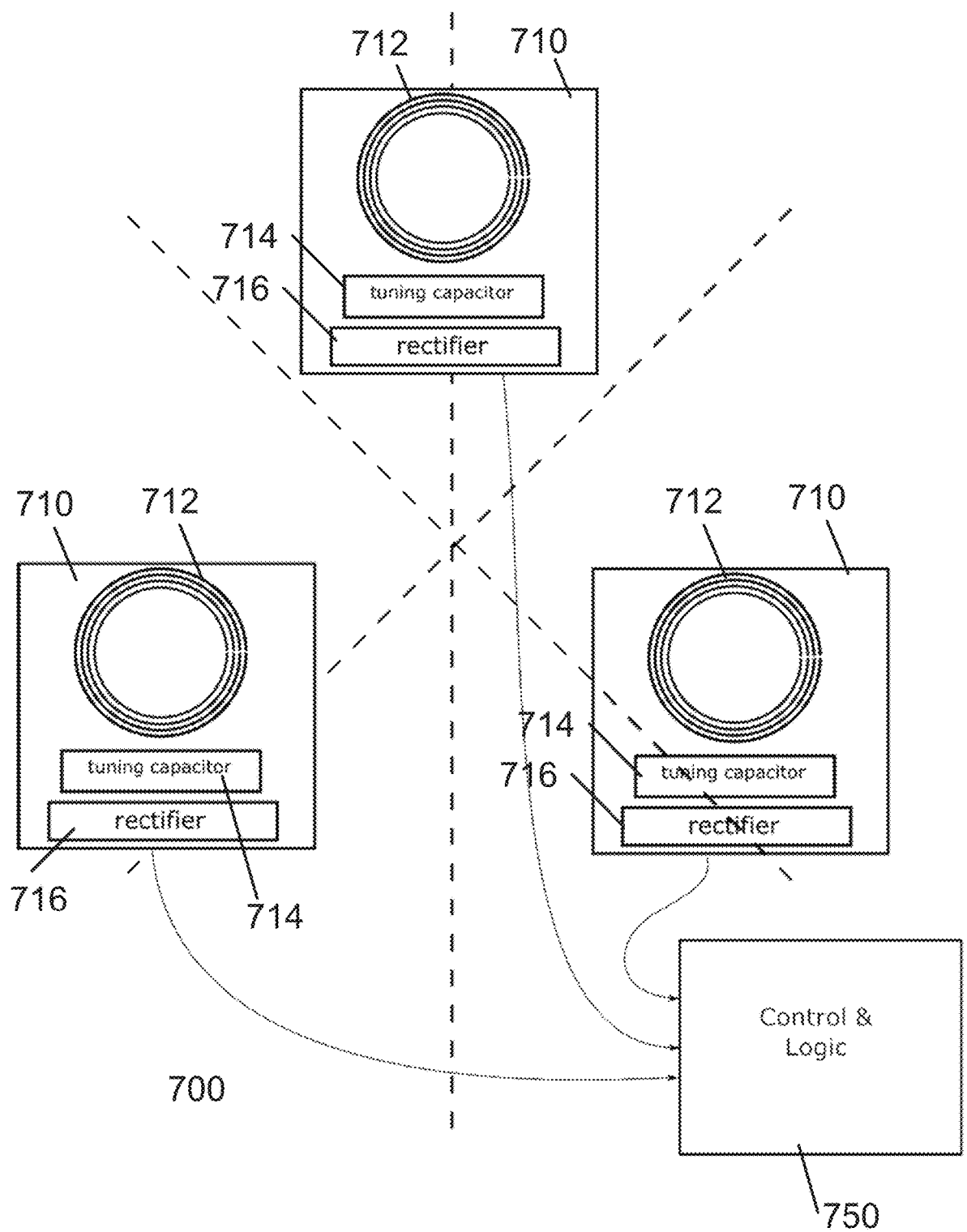
FIG. 7 is a partial block diagram of another embodiment of the alignment device of FIG. 3.

Although a particular configuration of the alignment device 300 has been described, one of reasonable skill in the art will appreciate that other configurations are possible. Turning now to FIG. 7, another embodiment of an alignment device generally identified by reference numeral 700 is shown. The alignment device 700 comprises all of the elements of the previously described alignment device 300 unless otherwise stated. The alignment device 700 functions similarly to the previously described alignment device 300 unless otherwise stated. The alignment device 700 comprises three FDUs 710, each comprising a coil 712, at least one tuning capacitor 714 and a rectifier 716. The three FDUs 710 are coplanar and are arranged in an equilateral formation. Each FDU 710 is electrically connected to the main board (not shown). The main board of the alignment device 300 is identical to the previously described main board 318. In the illustrated embodiment, the main board is incorporated into a control and logic module 750.

Using three coils 712, the module 750 is configured to triangulate the optimal position of the coils 712 in relation to the transmitter coil 212. When all coils 712 are intersected by the alternating magnetic field equally, (or near equally), optimal alignment has been achieved, as will be described. One of reasonable skill in the art will recognize that the alignment device may also comprise further control and logic components, including, but not limited to, the use of a microprocessor, microcontroller, logic processor, or other possible controls.

Figure 8:
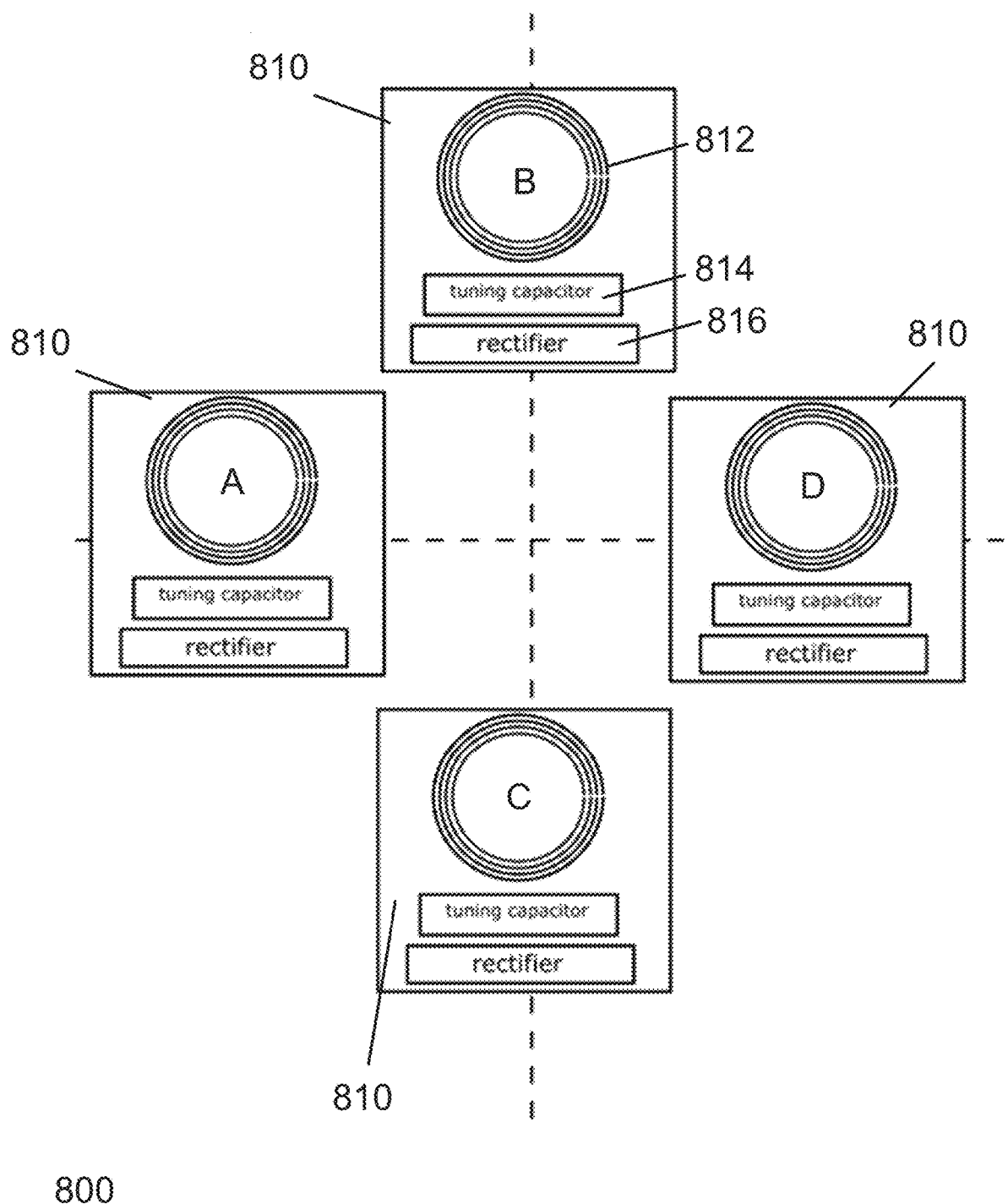
FIG. 8 is partial block diagram of another embodiment of the alignment device of FIG. 3.

FIG. 8 shows another embodiment of an alignment device generally identified by reference numeral 800. The alignment device 800 comprises all of the elements of the previously described alignment device 300 unless otherwise stated. The alignment device 800 functions similarly to the previously described alignment device 300 unless otherwise stated. The alignment device 800 comprises four coplanar FDUs 810. Each FDU 810 comprises a coil 812, at least one tuning capacitor 814 and a rectifier 816. Thus, the alignment device 800 comprises four coils 812, four tuning capacitors 814, and four rectifiers 816. Each of the four coils 812 is electrically connected to a different tuning capacitor 814. Each of the four tuning capacitors 814 is electrically connected to a different rectifier 816. Each FDU 810 is electrically connect to the main board (not shown). The main board of the alignment device 800 is identical to the previously described main board 318. As such, each rectifier 816 of each FDU 810 is electrically connected to the voltage divider 320 of the main board 318.

In this embodiment, the FDUs 810 are orthogonally positioned in respect to each other. The FDUs 810 are coplanar and positioned in the X-Y plane with two FDUs 810 opposite to, and laterally spaced from, each other along the X-axis and two FDUs 810 opposite to, and laterally spaced from, each other orthogonally along the Y-axis.

In this embodiment, the alignment device 800 comprises four FDU 810 each having a coil 812. The coils 812 are positioned at fixed distances from each other to detect the strength of AC magnetic field generated by the transmitter 210. The value of the detected magnetic field strength at each coil 812 is used to determine the optimal alignment position. In this embodiment, the indicator on the main board of the alignment device 800 is an LED. Similar to the alignment device 300, the alignment device 800 comprises a main board 318 comprising a voltage divider 320, a comparator 322, which in this embodiment takes the form of a comparator circuit, a sensitivity control 323 and indicators 324, one for each FDU. The main board and the components comprised thereon are identical to the previously described main board 318 and components comprised thereon. In this embodiment, the sensitivity control is a turnable knob, dial or the like.

Figure 9:
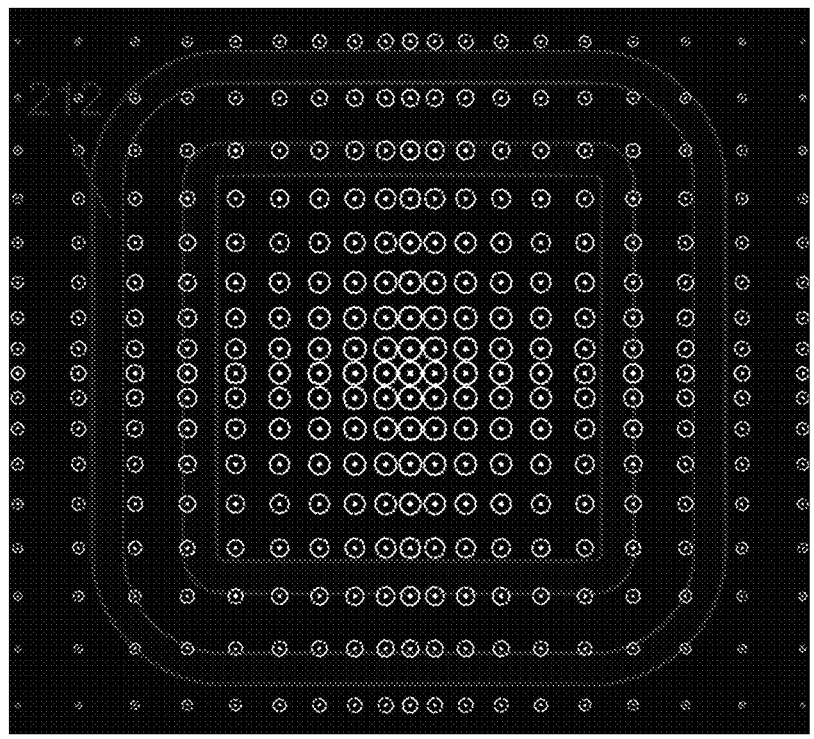
FIG. 9 is a magnetic field density plot generated by the transmitter of the high frequency wireless power transfer system of FIG. 2.

Turning now to FIG. 9, an example of a magnetic field density plot generated from a single transmitter 210 of the high frequency wireless power transfer system 200 is shown. As shown in FIG. 9, the magnetic field is stronger along the center axis of the transmitter coil 212, and weaker near the edges of the plot. Efficient coupling of the transmitter coil 212 and the receiver coil 222 occurs when the transmitter coil 212 and receiver coil 222 are aligned along their center axes as the coupling coefficient will be maximized. As previously stated, the alignment device 800 detects the strongest magnetic field from the transmitter 210 along its center axis to determine the optimal alignment position for the receiver 220 to be mounted.

During operation, the alignment device 800 is positioned in proximity to the transmitter coil 212. The alignment device 800 is positioned such that the magnetic field intersects at least one of the coils 812 of one of the FDUs 810 of the alignment device 800, which induces an AC voltage in at least one of the coils 812 of the alignment device 800. The alternating magnetic field intersecting the coil in the FDU 810 will induce an alternating voltage in the coil 812. The induced alternating voltage is rectified to a DC voltage via the rectifier 816. Positioning of the alignment device 800 can be a manual process or an automated process.

Figure 10:
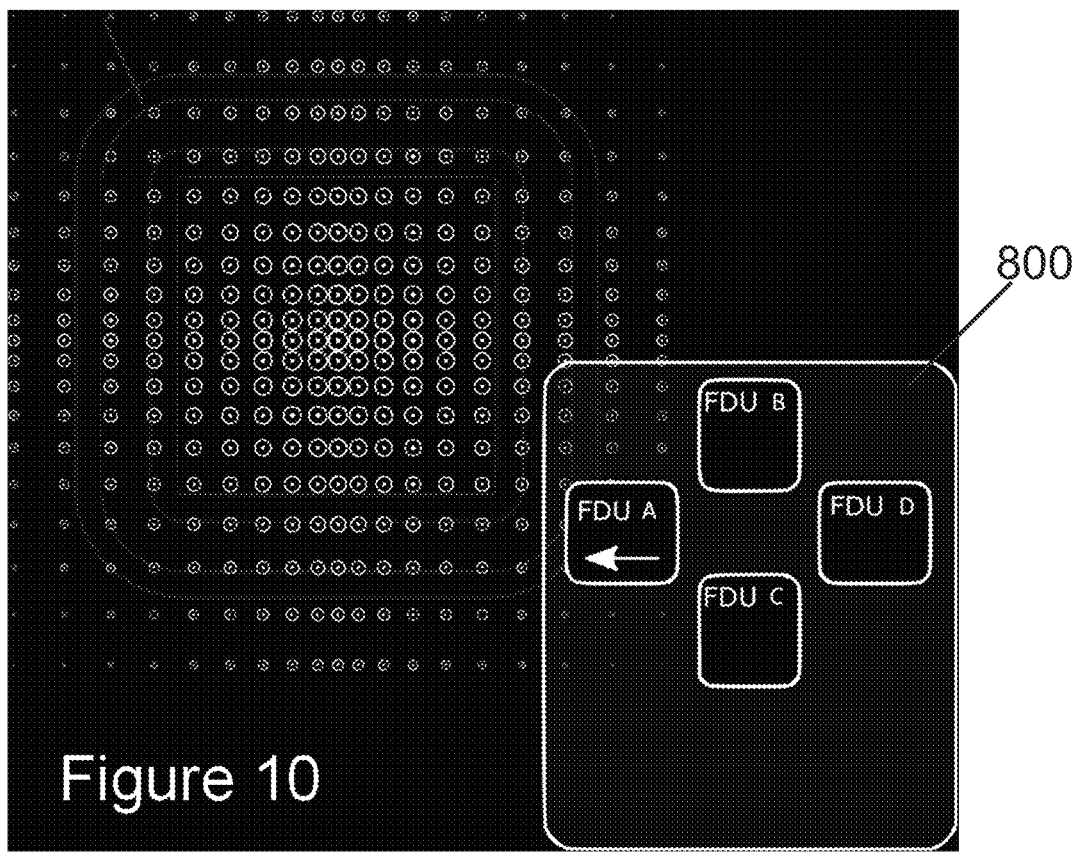
FIG. 10 is a plan view of the magnetic field density plot of FIG. 9 with the alignment device of FIG. 8.

Turning now to FIG. 10, the alignment device 800 with four FDUs 810 is shown over a magnetic field density plot generated from a single transmitter 210 of the high frequency wireless power transfer system 200. Depending on the position of the alignment device 800 in relation to the transmitter coil 212 of the transmitter 210, the coil 812 that is closest to the center of the transmitter coil 212 will have the highest rectified voltage as the magnetic field will be stronger. The remaining coils 812 will have a lower rectified voltage. The coil 812 with highest rectified (and scaled down) voltage, which exceeds the preset threshold voltage, will cause the indicator 824 to be triggered. The threshold voltage is set by a voltage sensitivity control 823 connected to the comparator circuit 822 on the main board 318. Consequently, the alignment device 800 is now relocated in the direction of the coil 812 which has the highest voltage.

Figure 11:
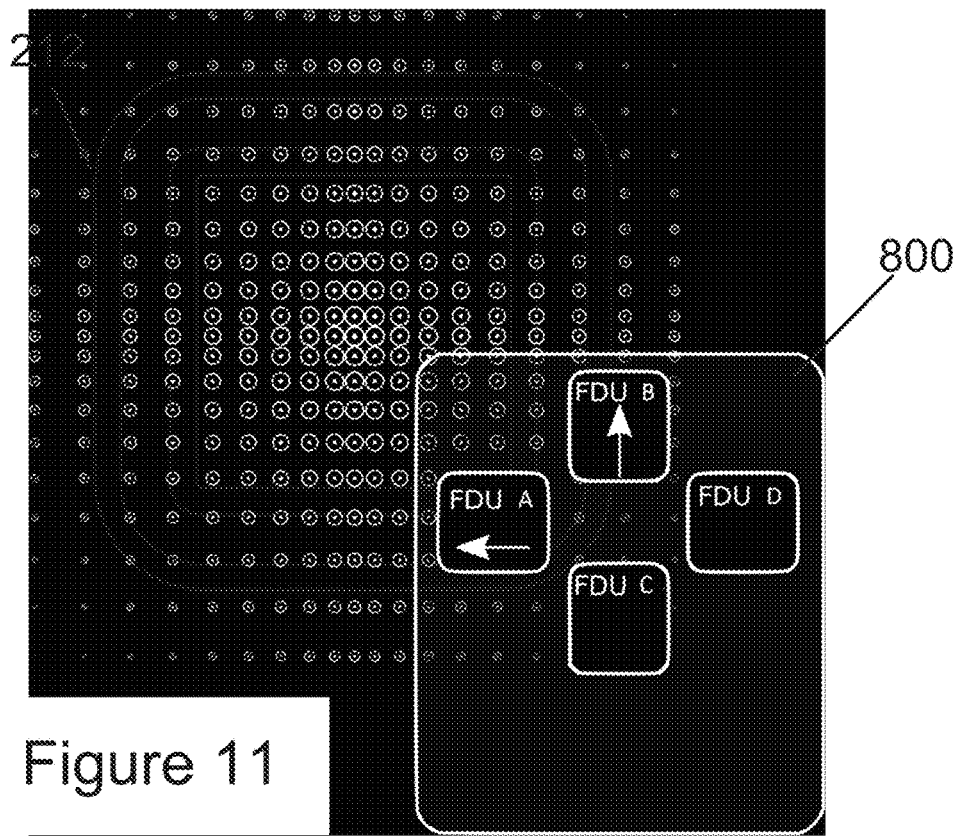
FIG. 11 is another plan view of the magnetic field density plot of FIG. 9 with the alignment device of FIG. 8 during operation.

FIG. 11 shows that as the alignment device 800 is moved in the direction of the highest rectified voltage, the next coil 812 that is now closer to the center of the magnetic field will now have an increase in its rectified voltage. As also shown in FIG. 11, the next coil to have an increase in rectified voltage must be orthogonal to the first coil 812.

For example, as shown in FIG. 10, if the first coil 812 with the highest rectified voltage is the left coil 812 of FDU 810 (A), the next coil 812 to have an increased rectified voltage will be either the top coil 812 of FDU 810 (B) or the bottom coil 812 of FDU 810 (C). Based on the orthogonality, the next coil 812 to have an increased rectified voltage cannot be the coil 812 of the FDU 810 (D). It is possible that the coils 812 of both FDU 810 (B) and FDU 810 (C) can simultaneously have an equal, or near equal, increase in rectified voltage, when coil 812 of FDU 810 (B) and coil 812 of FDU 810 (C) are both equidistant from the x axis, signifying that the alignment device 800 is aligned along the x axis.

As the first coil 812 of FDU 810 (A), intersects with the magnetic field of the transmitter 210, the rectified voltage is scaled down via the voltage divider 320 and is then measured by the main board 318 which sends the voltage data to the comparator circuit 322. The comparator circuit 322 compares the rectified voltage of FDU 810 (A) against the preset threshold voltage. When the rectified voltage of the FDU 810 (A) exceeds the preset voltage threshold, a signal is sent from the main board 318 to the indicator 324 associated with FDU 810 (A) to activate. The comparison of rectified voltage by the comparator circuit 322 against the preset threshold voltage repeats throughout the alignment process. The indicator 324 will turn on and off if the rectified voltage is higher or lower than the preset threshold. The indicator 824 activation is indicative of the direction in which the alignment device 800 should be repositioned in order to achieve alignment of the other FDUs 810. When all indicators 824 are activated, the alignment device 800 is in optimal alignment and all coils 812 are being intersected by the alternating magnetic field along the center axes of the transmitter coil 212. Following the intersection of the magnetic field with coil 812 of FDU 810 (A) and activation of the indicator 824, the alignment device 800 can be relocated in a new direction based on the position of the second coil 812 of a different FDU 810. In this embodiment the second coil 812 will either be the coil 812 of FDU 810 (B) or FDU 810 (C). For example, when the coil 810 of FDU 810 (B) is intersected by the magnetic field and the rectified voltage exceeds the preset threshold voltage, the indicator 824 for FDU 810 (B) will activate.

Figure 12:
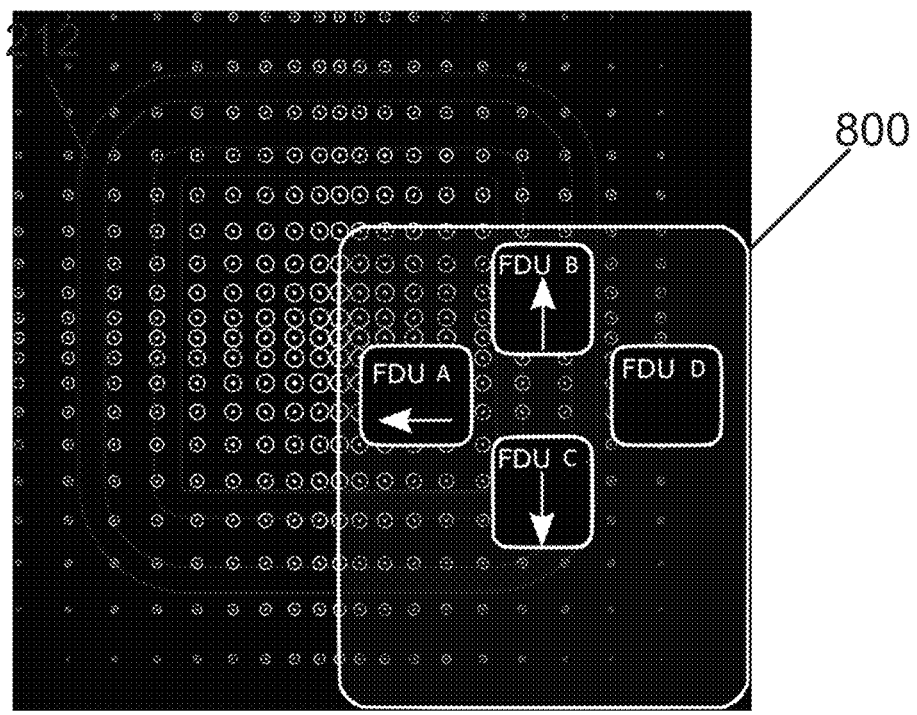
FIG. 12 is another plan view of the magnetic field density plot of FIG. 9 with the alignment device of FIG. 8 during operation.

As this alignment method is followed, the alignment device 800 is repositioned based on the intersection of the magnetic fields with the coils 812 of the FDUs 810 and the subsequent activation of the indicators 824. Next, a third FDU 810 coil 812 will have an increase in voltage. Depending on the movement of the alignment device 800, the next coil 812 to have an increase in rectified voltage will be the coil 812 of either FDU 810 (C) or FDU 810 (D). As previously described, the coil 812 must be located orthogonally from a coil 812 that already has an increased voltage. In this example, coil 812 of FDU 810 (C) or coil 812 of FDU 810 (D) can be activated based on the direction of movement in relation to the alternating magnetic field from the transmitter 210. Therefore, in this embodiment, as shown in FIG. 12, the third coil 812 to activate must be orthogonal to the coil 812 of FDU 810 (A) or FDU 810 (B).

Figure 13:
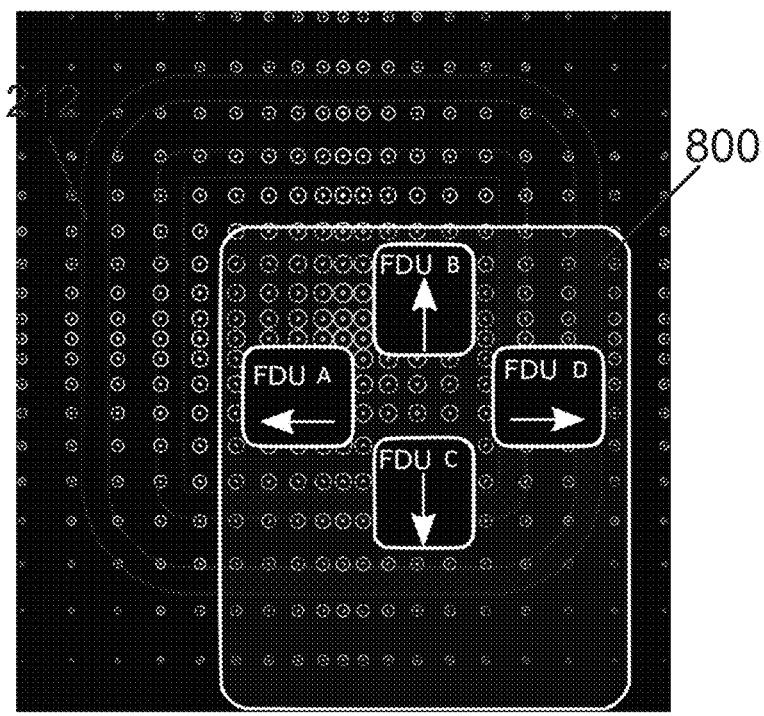
FIG. 13 is another plan view of the magnetic field density plot of FIG. 9 with the alignment device of FIG. 8.

Finally, with three of the four coils 812 intersected by the magnetic field, and their relative indicators 824 activated, the alignment device 800 will now be moved in the average direction of the activated indicators 824. In this embodiment, the alignment device 800 must be moved toward the indicator activated by coil 812 of FDU 810 (A). As shown in FIG. 13, by moving the alignment device 800 in the general direction of coil 812 of FDU 810 (A), the coil 812 of FDU 810 (D), will have an increase in rectified voltage.

Figure 14:
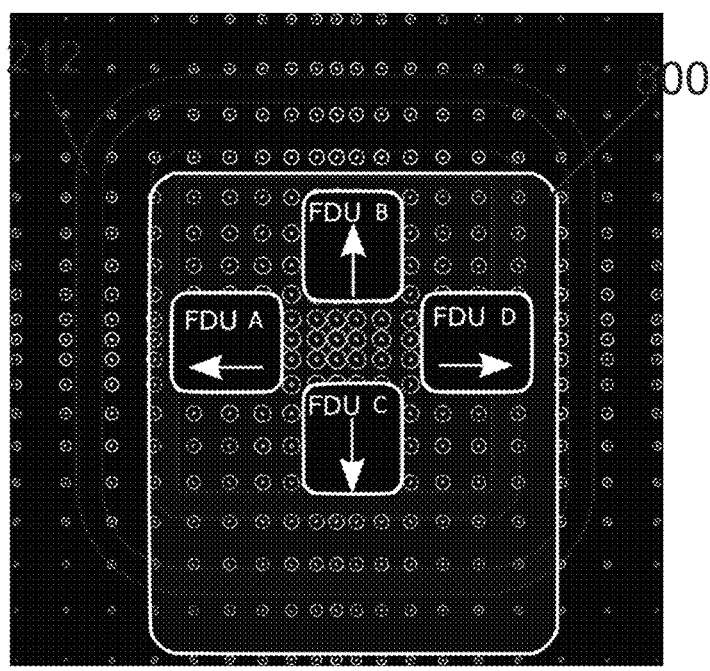
FIG. 14 is another plan view of the magnetic field density plot of FIG. 9 with the alignment device of FIG. 8 during operation.

Once the voltages on all coils 812 are equal (or near equal), and all four of the indicators 824 are activated, as shown in FIG. 14, the alignment device 800 is now at a position where the magnetic field intersecting all four coils 812 is equal (or near equal) in strength. Consequently, this position of the alignment device 800 must be the optimal aligned position at which the maximum coupling coefficient value and the highest wireless power transfer efficiency are achieved.

When the alignment device 800 is in the optimal aligned position, the position can be marked on the material 230 on which the receiver 220 is to be mounted. Marking of the position can be executed with a writing apparatus via through-holes on the alignment device 800. The through-holes on the alignment device 800 match the coordinates of the mounting points on the receiver 220. The writing apparatus may be a pencil, pen, marker, etc., or any narrow-ended, pointed or sharp object able to fit in the through-holes of the alignment device 800 to mark or indent the material 230 on which the receiver 220 is to be mounted and aligned with the transmitter 210.

Figure 15:
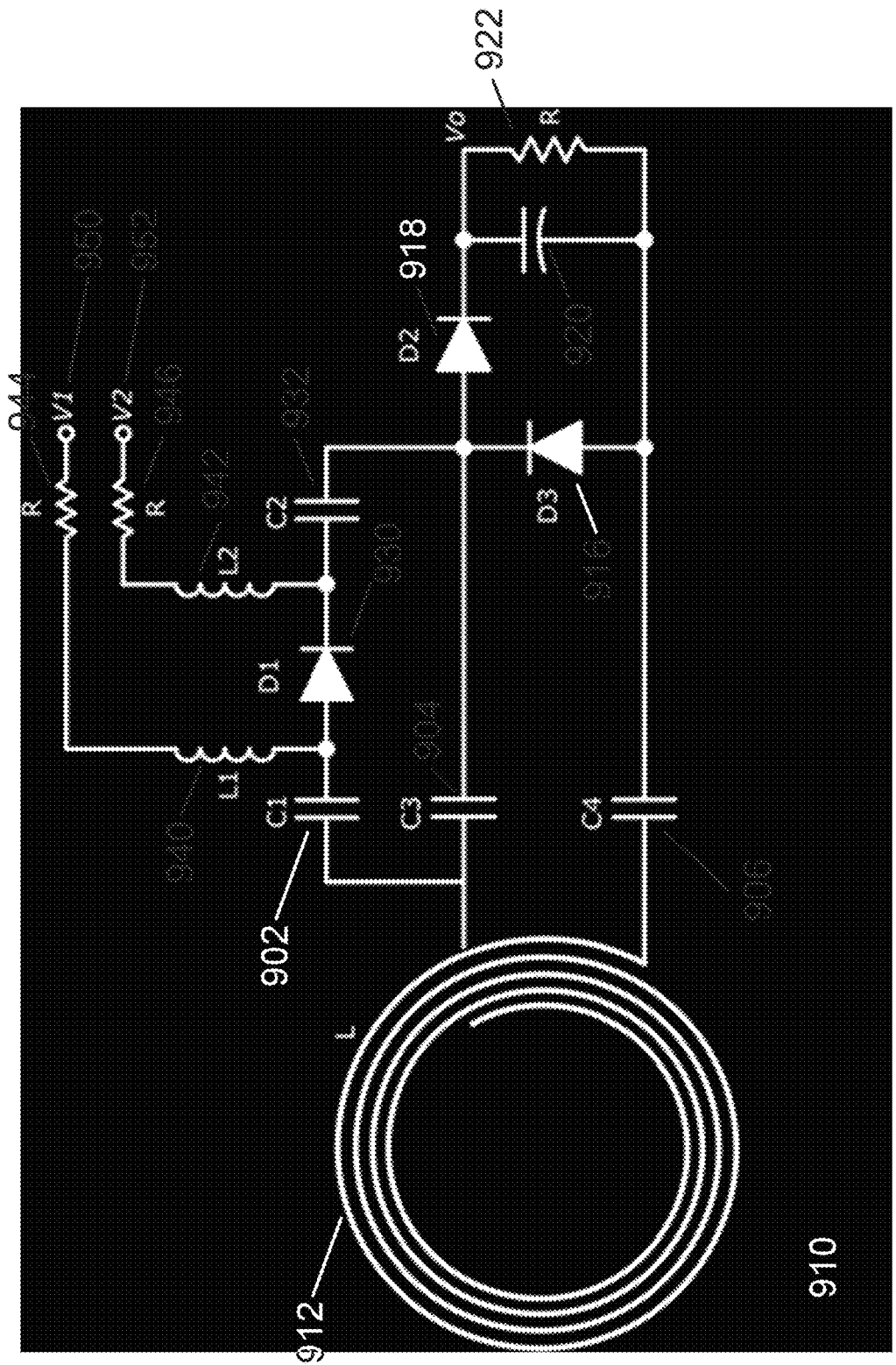
FIG. 15 is a partial schematic layout of another FDU of the alignment device of FIG. 3.

While a particular FDU has been described, one of reasonable skill in the art will appreciate that other configurations are possible. Turning now to FIG. 15, another embodiment of an FDU 910 of an alignment device is illustrated. The FDU 910 is generally referred to as a pin diode configuration. In this embodiment, the FDU 910 comprises at least one coil 912. The coil 912 is identical to previously-described coil 312 unless otherwise stated. The coil 912 is electrically connected to three parallel capacitors 902, 904, 906 having capacitances C1, C3 and C4, respectively. As with the FDU 310, the capacitors 904 and 906 are connected to a rectifier formed from a diode 916 (D3) connected in parallel, a diode 918 (D2) connected in series to capacitor 904, a capacitor 920 connected in parallel between diodes 916 and 918, and a resistor 922 having a resistance R connected in parallel to the capacitor 920. A voltage at the resistor 922 is given as Vo.

The FDU 910 further comprises a diode 930 (D1) connected to the capacitor 902, and a capacitor 932 having a capacitance C2 connected to the diode 930. The diode 930 is connected in parallel to two choke inductors 940, 942 having inductances of L1 and L2, respectively. Each choke inductor 940, 942 blocks AC current only and only allows DC current. Each inductor 940, 942 is connected in series to a resistor 944, 946, respectively. Each resistor 944, 946 is connected in series to a voltage source 950, 952, respectively, having a voltage V1 and V2, respectively.

In the illustrated arrangement, diode 930 (D1) is a pin diode. The diode 930 is ON, i.e. current flows through the diode 930, when voltage V1 is greater than voltage V2, and OFF, i.e. no current flows through the diode 930, when voltage V1 is less than voltage V2. The diode 930 is used to "switch in" capacitors 902 and 932 to decrease the resonant frequency of the coil 312.

Capacitance $C_A$ is defined as the cumulative capacitance of capacitors 902, 932, 904 and 906 (C1, C2, C3 and C4) at a frequency $f_A$, and capacitance $C_B$ is defined as the cumulative capacitance of capacitors 902, 932, 904 and 906 (C1, C2, C3 and C4) at a frequency $f_B$. In an exemplary embodiment, frequency $f_A$ is equal to 6.78 MHz and frequency $f_B$ is equal to 13.56 MHz. When the diode 930 (D1) is OFF capacitance $C_B$ is achieved and when the diode 930 (D1) is ON capacitance $C_A$ is achieved.

Given the stated frequencies, frequency $f_B$ is equal to twice frequency $f_A$ as expressed in equation (1) as:

$$f_B = 2*f_A \qquad (1)$$

There is a squared relationship between frequency and capacitance, therefore doubling the frequency results in 4 times the capacitance in the circuit. Accordingly, capacitance $C_A$ is equal to four times the capacitance $C_B$ as expressed in equation (2) as:

$$C_A = 4*C_B \qquad (2)$$

For a given value of capacitance C4, capacitance C3 may be expressed in equation (3) as:

$$C_3 = \frac{C_B C4}{C4 - C_B} \qquad (3)$$

When capacitance C1 is equal to capacitance C2 and the equivalent capacitance $C_T$ is equal to two times capacitance C1 or C2, then the equivalent capacitance $C_T$ may be expressed in equation (4) as:

$$C_T = \frac{C4 C3 - C_A(C4 - C3)}{C_A - C4} \qquad (4)$$

The equivalent capacitance $C_T$ is the equivalent capacitance of the capacitors 902, 932 when the diode 930 is ON. Capacitance C4 is selected to be sufficiently large in order to avoid negative values for capacitance C3. Capacitance C3 is selected to be sufficiently small to allow equivalent capacitance $C_T$ to be positive.

Figure 16:
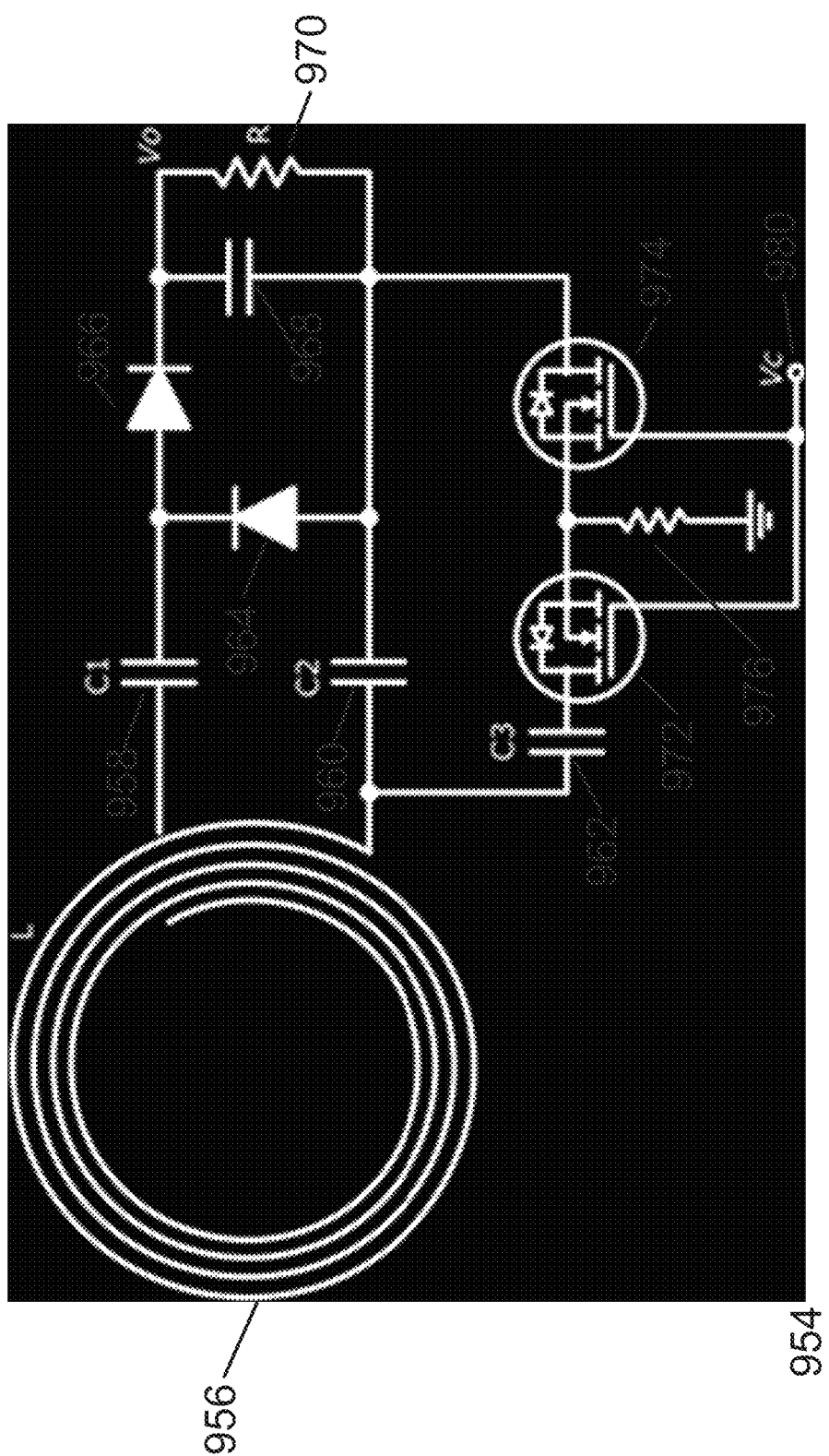
FIG. 16 is a partial schematic layout of another FDU of the alignment device of FIG. 3.

Turning now to FIG. 16, another embodiment of an FDU 954 of an alignment device is illustrated. The FDU 954 is generally referred to as a metal oxide semiconductor field effect Transistor (MOSFET) configuration. In this embodiment, the FDU 954 comprises at least one coil 956. The coil 956 is identical to previously-described coil 312 unless otherwise stated. The coil 956 is electrically connected to three parallel capacitors 958, 960, 962 having capacitances C1, C2 and C3, respectively. As with the FDU 310, the capacitors 958, 960 are connected to a rectifier formed from a diode 964 connected in parallel, a diode 966 connected in series to the capacitor 958, a capacitor 968 connected in parallel between diodes 964, 966, and a resistor 970 having a resistance R connected in parallel to the capacitor 968. A voltage at the resistor 970 is given as Vo.

The capacitor 962 is connected to a pair of opposing positioned transistors 972, 974 which are connected to the capacitor 968. The transistors 972, 974 are configured to switch the increased capacitance of the capacitor 962 into or out of a resonating circuit of the FDU 954. The resonating circuit comprises the coil 956 of the FDU 954 and other resonating components, i.e. capacitors 958, 960, 962, 968.

A resistor 976 is connected in parallel between the transistors 972, 974. The resistor 976 is a choke insulator resistor. The choke insulator resistor is connected to ground. The transistors 972, 974 are configured to prevent an AC signal from bridging across both transistors 972, 974 in their powered off state. The transistors 972, 974 are connected at their drains to a voltage source 980 having a voltage Vc. The voltage source 980 is an AC voltage source.

The drain of the transistor 972 is connected to the capacitor 962 while the source of the transistor 972 is connected to the source of the transistor 974. The drain of the transistor 974 is connected to the capacitor 968. When powered off, the transistors 972, 974 act as diodes.

If a single transistor 972 or 974 were present, rather than two transistors 972, 974, a sufficiently high voltage (typically over 0.7 volts) would pass through on either the positive or negative waveform of the voltage source 980.

With two transistors 972, 974 connected in series, and their diode-like directions reversed, i.e. the source of each transistor 972, 974 connected to each other, what would have passed through one transistor, will not pass through the other. The resistor 976 maintains a zero reference DC voltage between transistors 972, 974.

The relationship between resonating frequency and the inductor/capacitor may be given in equation (5) as:

$$f = \frac{1}{2\pi\sqrt{LC}} \quad (5)$$

where f is the frequency of magnetic field to be detected, L is the inductance of the coil 956, and C is the capacitance of the resonating circuit of the FDU 954.

The equivalent capacitance of the resonating circuit when the transistors 972, 974 are allowing current to flow is given by $C_{low}$. The equivalent capacitance of the resonating circuit when the transistors 972, 974 are not allowing current to flow is given by $C_{high}$. In low frequency use cases, the capacitance ($C_{fet}$) of each transistor 972, 974 is negligible and may be ignored. The required inductance of the coil 956 and the capacitances C1, C2, C3 of the capacitors 956, 960, 962, respectively, may be calculated accordingly for a given frequency, e.g. 6.78 MHz.

Figure 17:
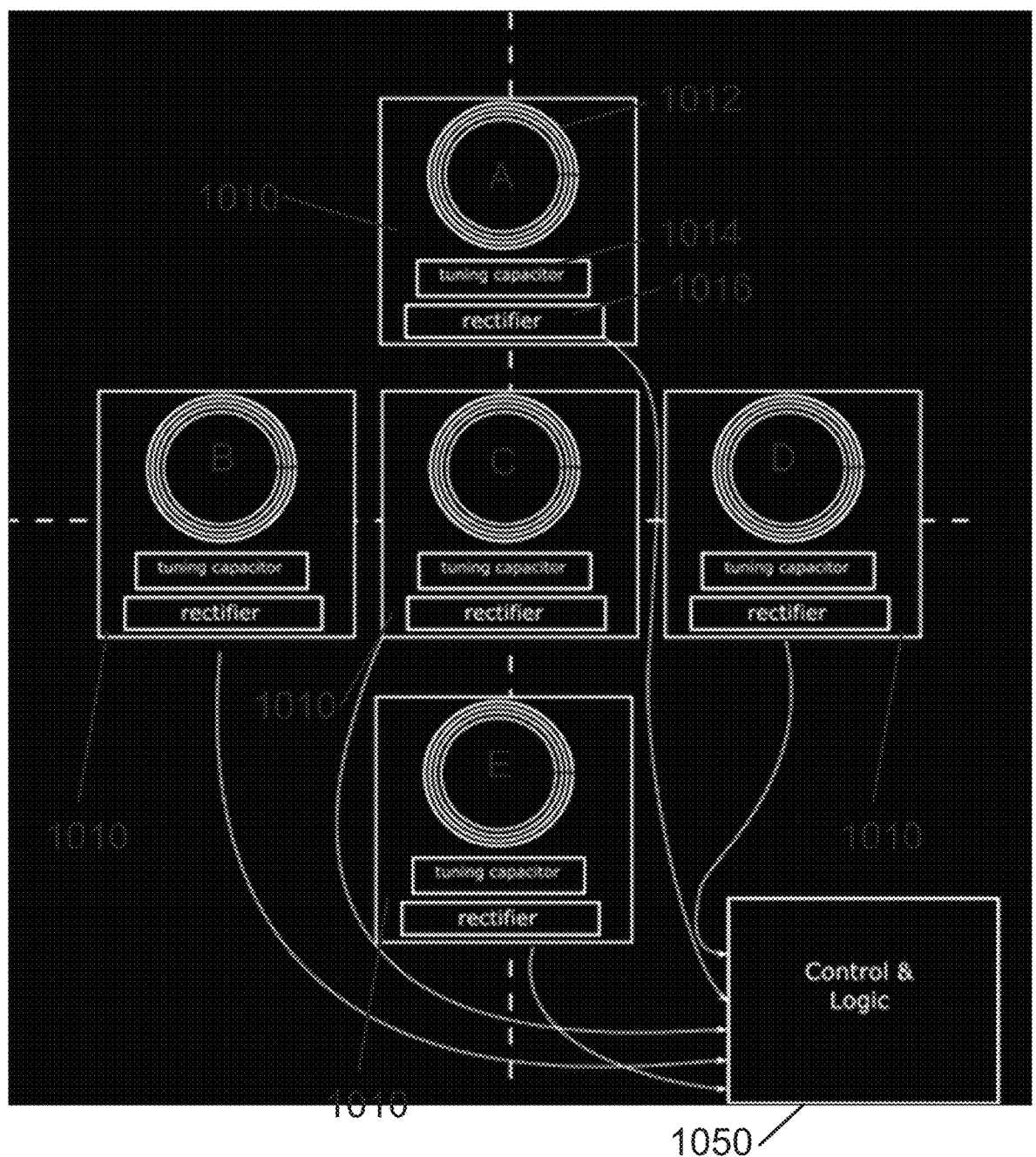
FIG. 17 is a partial block diagram of another embodiment of the alignment device of FIG. 3.

Turning now to FIG. 17, another embodiment of an alignment device generally identified by reference numeral 1000. The alignment device 1000 comprises all of the elements of the previously described alignment device 300 unless otherwise stated. Similarly, the alignment device 1000 functions similarly to the previously described alignment device 300 unless otherwise stated. The alignment device 1000 comprises five coplanar FDUs 1010. Each FDU 1010 comprises a coil 1012, at least one tuning capacitor 1014 and a rectifier 1016. Thus, the alignment device 1010 comprises five coils 1012, five tuning capacitors 1014, and five rectifiers 1016. Each of the five coils 1012 is electrically connected to a different tuning capacitor 1014. Each of the five tuning capacitors 1014 is electrically connected to a different rectifier 1016. Each FDU 1010 is electrically connect to the main board (not shown). The main board of the alignment device 1000 is identical to the previously described main board 318 unless otherwise stated. Each rectifier 1016 of each FDU 1010 is electrically connected to the voltage divider 320 of the main board 318.

In this embodiment, the FDUs 1010 are orthogonally positioned in respect to each other. Two FDUs 1010 (indicated by the letters B and D) are coplanar and positioned in the X-Y plane with two FDUs 1010 opposite to, and laterally spaced from, each other along the X-axis, and equidistant to a central FDU 1010 (indicated by the letter C). The two other FDUs 1010 (indicated by the letters A and E) are opposite to, and laterally spaced from, each other orthogonally along the Y-axis, and equidistant to the central FDU 1010 (C).

The coils 1012 are positioned at fixed distances from each other to detect the strength of AC magnetic field generated by the transmitter 210. The value of the detected magnetic field strength at each coil 1012 is used to determine the optimal alignment position.

As illustrated in FIG. 17, the alignment device further comprising a control and logic module 1050. Similar to alignment devices 300 and 800, the alignment device 1000 comprises the main board which, in the illustrated embodiment, is incorporated in the module 1050. The main board 318 comprises a voltage divider 320, a comparator 322, which in this embodiment takes the form of a comparator circuit, a sensitivity control 323 and indicators 324. In the illustrated embodiment, the main board comprises five indicators, each indicator associated with an FDU 1010 of the alignment device 1000. The main board and the components comprised thereon are identical to the previously described main board and components comprised thereon. In this embodiment, the indicators are LEDs. In this embodiment, the sensitivity control 323 is a turnable knob, dial or the like. The module 1050 may further comprise a microcontroller, microprocessor, computer or any other computing means. The module 1050 may further comprise a suitable storage means, e.g. computer-readable memory, and one or more processors.

The module 1050 is configured to analyze field strength in two directions: vertical and horizontal. In one embodiment, the module 1050 receives voltages detected at the FDUs 1010. The module 1050 analyzes the received voltages and controls indicators associated with the FDUs 1010. In particular, the module 1050 controls one or more LEDs to operate, light up, continuously or in a repeating pattern. The module 1050 may control the time between an LED turning on and off. The module 1050 controls an indictor to stay off until controlled to operate, e.g. turn on.

In the illustrated arrangement, the field is the magnetic field. The module 1050 is configured to analyze field strength in the vertical direction and the horizontal direction independent of each other. Magnetic field data collected from the FDUs 1010 (B, C, D) form horizontal field data. Magnetic field data collected from the FDUs 1010 (A, C, E) form vertical field data. The collected horizontal and vertical field data is analyzed at the module 1050.

When the center FDU 310 (C) detects the highest voltage compared to all detected voltages at its associated coil 1012, the alignment device 1000 is aligned with the transmitter 210 and the optimal position of a receiver is determined.

In use, the alignment device 1000 is positioned within a two-dimensional plane (X-Y plane) which has a fixed orthogonal distance from the plane of the transmitter 210 and associated transmitter coil 212. The orthogonal distance is determined by the thickness of the material 230 separating the alignment device 1000 from the transmitter 210. As the material 230 has a uniform thickness, the two-dimensional planes of the alignment device 1000 and the transmitter 210 are parallel to each other.

Initially the FDUs 1010 detect voltages at various frequencies, e.g. two frequencies at 6.78 MHz and 13.56 MHz, to determine at which frequency the detected voltages are higher. Based on the higher detected voltage, the module 1050 determines which frequency the transmitter 210 is operating at and controls the FDUs 1010 to detect voltages at this frequency.

Comparisons between voltages are based off a running average of the voltage at each coil 1012 of the FDUs 1010 to avoid choppy LED operations.

If no voltage is detected, the alignment device 1000 stops detecting voltage for a predetermined amount of time or until a user instructs the alignment device 1000 to again detect voltages to preserve power. Is this configuration, the alignment device 1000 is in a standby mode. The standby mode is indicated by one LED on each FDU 1010 being lit at a time in a clockwise pattern.

Once the module 1050 has determined the frequency at which the transmitter 210 is operating, all five FDUs 1010 collect voltages and these are transferred to the module

1050. As described above, the module 1050 separately analyzes horizontal and vertical data.

The module 1050 determines from the horizontal field data (from FDUs 1010 B, C, D) and vertical field data (from FDUs 1010 A, C, E) in which direction the center of the magnetic field is located. If the alignment device 1000 is significantly misaligned and the direction cannot be determined, the LEDs associated with the FDUs 1010 blink along the misaligned direction.

Figure 18:
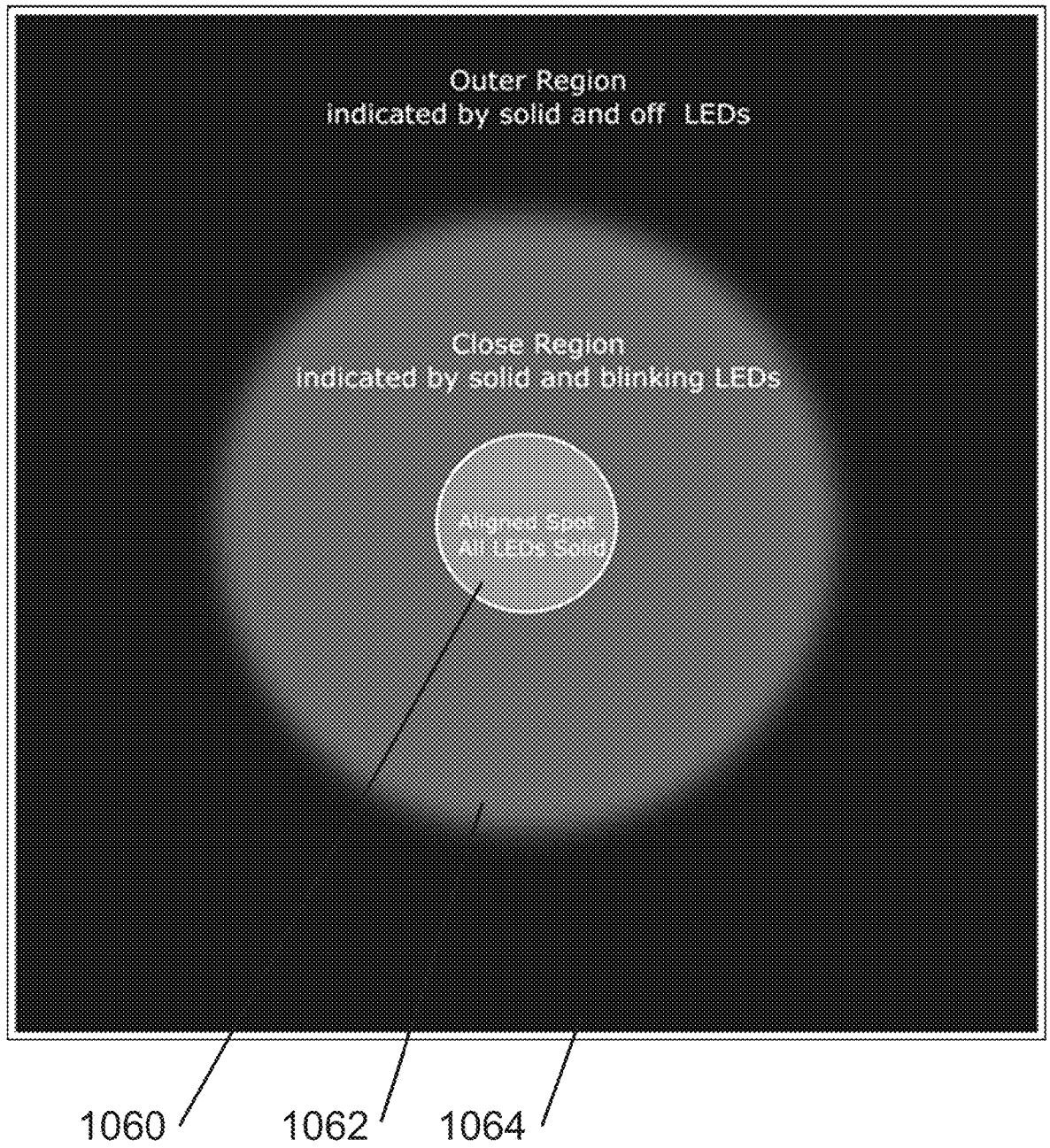
FIG. 18 is a proximity diagram indicating regions of proximity of an alignment device to an optimal alignment.

As shown in FIG. 18, the alignment device 1000 may be in different regions prior to being in optimal alignment. Specifically, the alignment device 100 may be in an outer region (low proximity) 1064, inner region (mid proximity) 1062 and aligned spot 1060. The aligned spot 1060 corresponds to an area within which optimal alignment with the transmitter 210 is achieve.

As the alignment device 1000 approaches alignment from far away, the alignment device is in the outer region (low proximity) 1064. In this outer region 1064 one LED associated with the FDUs 1010 is lit to indicate where the center of the magnetic field (and alignment), i.e. spot 1060, is located, and accordingly in which direction the device 1000 should be moved. When the alignment device 1000 enters the inner region (mid proximity) 1062, the LED facing away from the spot 1060 begins to blink at a low frequency, increasing in frequency as the device 1000 approaches the spot 1060 and optimal alignment. When the alignment device 1000 is aligned at the spot 1060 in optimal alignment, both of the aforementioned LEDs remain ON with no blinking.

This process may be performed separately for both vertical and horizontal alignment, or performed simultaneously for both vertical and horizontal alignment.

In a particular embodiment, if the alignment device 1000 has not detected a significant magnetic field for a specified period of time, the alignment device 1000 may power down. The alignment device 1000 may power on after a period of time or upon activation by a user as previously described.

Figure 19:
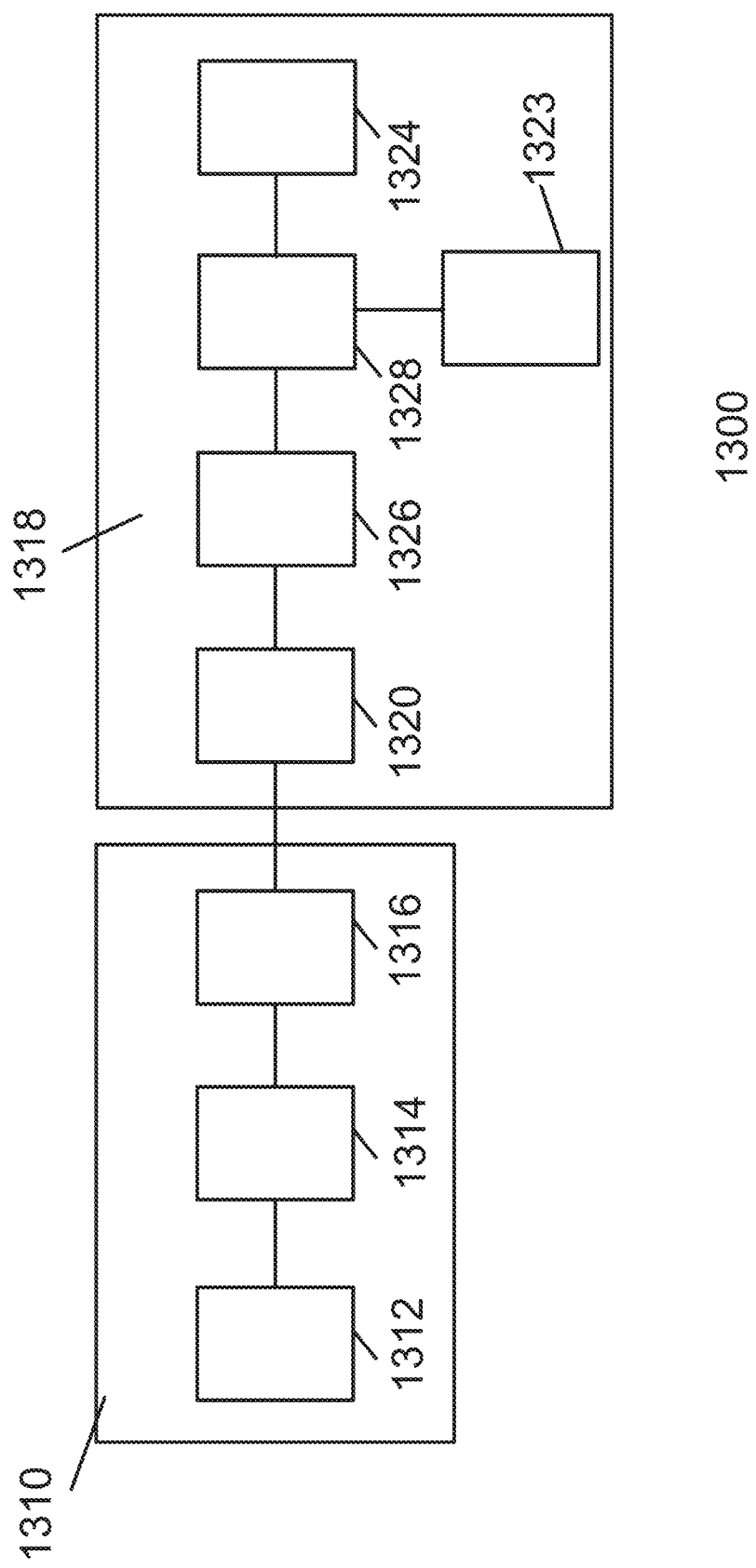
FIG. 19 is a block diagram of another embodiment of the alignment device of FIG. 3.

Although a particular configuration of the previously described main boards 310 and 810 has been described, one of skill in the art will appreciate that other configurations are possible. Turning now to FIG. 19, a block diagram of another embodiment of an alignment device generally identified by reference numeral 1300. The alignment device 1300 comprises all of the elements of the previously described alignment device 300 unless otherwise stated. In this embodiment, the main board 1318 comprises a voltage divider 1320, an analog-to-digital (A/D) converter 1326, a microcontroller 1328, a sensitivity control 1323 and one or more indicators 1324. The voltage divider 1320 is electrically connected to the rectifier 1316 of the FDU 1310. The voltage divider 1320 is also electrically connected to the A/D converter 1326. The A/D converter 1326 is electrically connected to the voltage divider 1320 and to the microcontroller 1328. The sensitivity control 1323 is connected to the microcontroller 1328. One of reasonable skill in the art will appreciate that the microcontroller 1328 may take the form of a computer. Furthermore, one of reasonable skill in the art will recognize that the microcontroller 1328 could easily be replaced with a microprocessor 328. One of reasonable skill in the art will recognize that multiple FDUs 1310 attached to one main board 1318 is possible, and as such, multiple indicators 1324 are also possible.

The voltage divider 1320 is configured to scale down the rectified voltage from the rectifier 1316. The A/D converter 1326 is configured to convert the analog voltage from the voltage divider 1320 into a digital voltage signal. The digital voltage signal is then processed by the microcontroller 328. Specifically, the digital voltage signal is fed into the microcontroller 1328, where the comparison of the digitized voltage against the preset threshold voltage is compared using software algorithms rather than a hardware comparator circuit 322. When the digital voltage signal exceeds the preset threshold voltage, the microcontroller 1328 is configured to signal the indicator(s) 1324 to activate. Specifically, the microcontroller 1328 activates the indicator(s) 1324 when the rectified voltage exceeds the threshold voltage.

While alignment devices have been described, one of skill in the art will appreciate that other configurations are possible. In another embodiment, any of the described alignment devices may further comprise a spirit level. The spirt level (also known as a bubble level or level) may improve ease of use of the alignment device. In this embodiment, the spirit level is a generally cylindrical and plastic although other shapes and materials are possible.

The sprit level ensures level installation of both the transmitter coil 212 and the receiver coil 222. Incorporating the spirit level into the alignment device may reduce the number of tools and personnel required to align the transmitter and receiver coils 212 and 222, respectively, as described.

While particular use cases of the described alignment devices have been described, one of reasonable skill in the art will appreciate that other use cases are possible. In particular, any of the described alignment devices may be used to create a spatial distribution of the detected magnetic field. In this embodiment, the alignment device further includes an accelerometer to measure the acceleration of the device. Detected voltages from the coils of all of the FDUs are combined with the acceleration data collected by the accelerometer to produce a spatial distribution of the magnetic field.

Figure 20A:
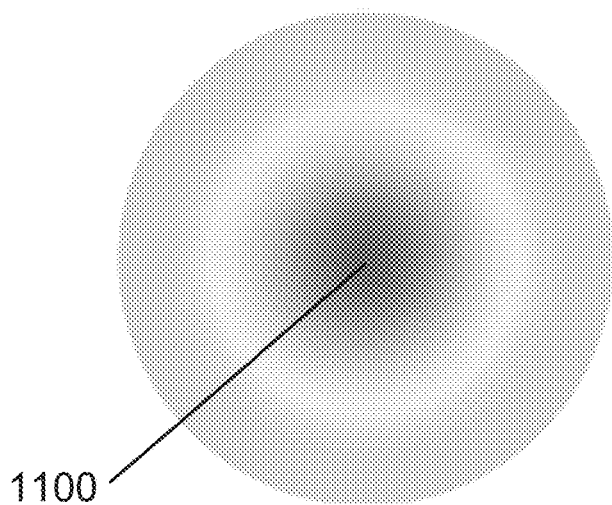
FIGS. 20A-20C are spatial distribution diagrams of detected magnetic fields.

An exemplary spatial distribution diagram of a detected magnetic field is illustrated in FIG. 20A. As illustrated in FIG. 20A, the central spot 1100 in the diagram indicates the position of optimal alignment.

Figure 20B:
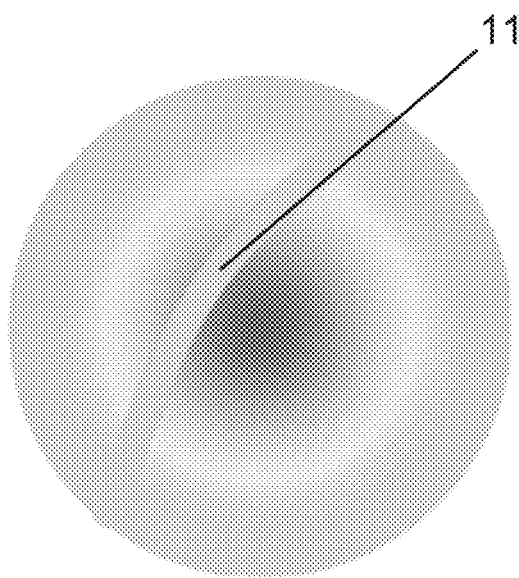
Figure 20C:
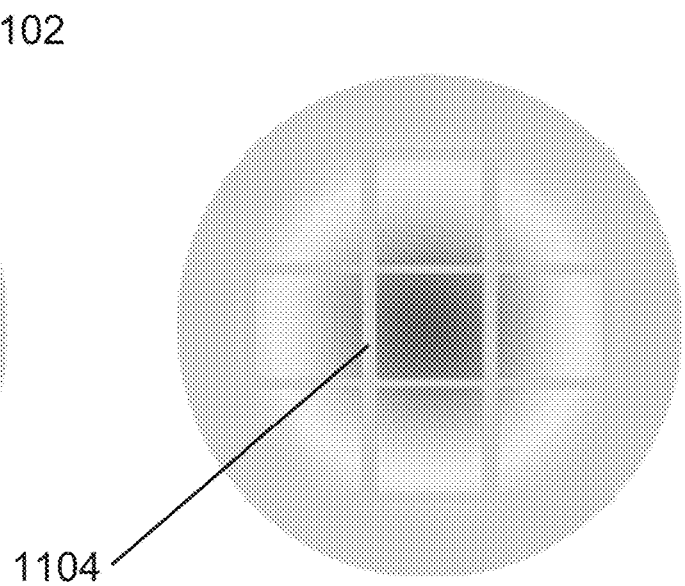

There may be cases where the spatial distribution diagram may be distorted, for example, when a metallic object like a wire bundle or mesh is present in the detection area. In this case the spatial distribution diagram may show a "magnetic footprint". FIG. 20B illustrates such a magnetic footprint as a footprint of a wire bundle 1102 on the spatial distribution diagram. FIG. 20C illustrates another magnetic footprint as a footprint of a metallic mesh 1104.

One of reasonable skill in the art will recognize that the alignment device 300 can be separate or part of the receiver 220. When the alignment device 300 is part of, or built into the receiver 220, there is no requirement for marking the position via through-holes, for example, as aligning the alignment device, simultaneously aligns the receiver in the optimal position for the most efficient transfer of power from the transmitter 210 to the receiver 220.

While particular alignment devices have been described, one of skill in the art will appreciate that other configurations are possible. In another embodiment, the described alignment devices further comprise controls and/or logic configured to apply certain logic to signals within the alignment device and control the alignment device. In one embodiment, controls and logic comprise a microprocessor, microcontroller, display, speaker, touchpad, button, knob, switch or other types of controls and logic elements.

While the alignment devices described comprise one or more coils and are configured for use in generating an induced voltage from a magnetic field, one of reasonable skill in the art will appreciate that other configurations are possible. In another embodiment, each FDU of the described alignment devices comprises an electrode as opposed to a coil. Furthermore, in this embodiment, each FDU comprises at least one tuning coil as opposed to at least one tuning capacitor. The tuning coil is configured to tune the electrode to the resonant frequency of the transmitter. The electrode of the alignment device is configured to generate an induced voltage from an electric field in order to determine the position of the alignment device in relation to the transmitter or transmitter coil of a wireless power transfer system. The electrode may take the form of any of the electrodes described in U.S. Pat. No. 10,424,942, the relevant portions of which are incorporated herein.

While optimal alignment has been described with respect to the transmitter 210 comprising the transmitter coil 212, and the receiver 220 comprising the receiver coil 222, one of reasonable skill in the art will appreciate that other configurations are possible. In another embodiment, the transmitter 210 comprises one or more capacitive electrodes, and the receiver 220 comprises one or more capacitive electrodes. The described alignment device determines the optimal alignment of the transmitter 210 and receiver 220 to achieve the maximum coupling coefficient value and hence, the highest power transfer efficiency. The transmitter capacitive electrodes and receiver capacitive electrodes are in optimal alignment when their centre axes normal to the transmitter capacitive electrodes and the receiver capacitive electrodes are collinear. The centre axis of each of capacitive electrode is the axis extending through the centre of mass of the respective capacitive electrode. Respective capacitive electrodes of the transmitter 210 and receiver 220 are in optimal alignment when the centre axes normal to both respective capacitive electrodes are collinear.

While the alignment devices described have been described in respect of a high frequency wireless power transfer, one of reasonable skill in the art will appreciate that other the alignment devices may be used in other wireless power systems. In another embodiment, the described alignment devices are configured for use in a wireless power system that is not high frequency.

One of reasonable skill in the art will also recognize that while the example alignment device 300 disclosed is designed for use with a high frequency inductive wireless power transfer system 200, it is also possible to apply the same concepts to create an alignment device 300 that will work other wireless power transfer systems 200, such as, but not limited to, non-resonant magnetic induction systems, resonant magnetic induction systems, non-resonant electric capacitive systems, resonant electric capacitive systems, low frequency magnetic induction or electric capacitive systems.

Those of skill in the art will appreciate that further variations and modifications may be made without departing from the scope of the appended claims.

What is claimed is:

1. An alignment device comprising:
   a coil configured to generate an induced voltage from a magnetic field, or an electrode configured to generate an induced voltage from an electric field, the coil or electrode forming part of a field detection unit (FDU); and
   a comparator configured to compare the induced voltage to a threshold voltage and activate an indicator based on the comparison,
   wherein the alignment device comprises a plurality of FDUs, each FDU comprising an individual coil configured to generate an induced voltage from a magnetic field, or an individual electrode configured to generate an induced voltage from an electric field, and
   wherein each FDU is identical.

2. The alignment device of claim 1, wherein the induced voltage is proportional to the strength of the magnetic field intersecting the coil, or to the electric field intersecting the electrode.

3. The alignment device of claim 1, wherein the alignment device is configured to align a transmitter and a receiver for optimal power transfer efficiency.

4. The alignment device of claim 1, wherein the alignment device is configured to align a transmitter coil and a receiver coil for optimal power transfer efficiency.

5. The alignment device of claim 1, wherein the alignment device is configured for use with a high frequency wireless power transfer system.

6. The alignment device of claim 1, wherein the FDU comprises at least one tuning capacitor configured to tune the coil.

7. The alignment device of claim 1, wherein the FDU comprises a rectifier configured to rectify the induced voltage from alternating current (AC) to direct current (DC).

8. The alignment device of claim 1, wherein the FDU comprises at least one diode configured to add capacitors to the coil to decrease a resonant frequency of the coil.

9. The alignment device of claim 1, wherein the alignment device comprises four FDUs orthogonally positioned with respect to each other in a plane.

10. The alignment device of claim 1, wherein the FDUs are positioned equidistant to each other in the plane.

11. The alignment device of claim 1, wherein the alignment device comprises five FDUs orthogonally positioned with respect to each other in a plane.

12. The alignment device of claim 11, wherein four FDUs are positioned equidistant to a central FDU in the plane.

13. The alignment device of claim 1, wherein each FDU is associated with an individual indicator.

14. The alignment device of claim 1, wherein the comparator forms part of a main board.

15. The alignment device of claim 14, wherein the main board further comprises at least one of the indicator, a voltage divider configured to scale down voltage, and a sensitivity control configured to control the threshold voltage.

16. The alignment device of claim 1, further comprises a spirit level.

17. A receiver comprising:
   one or more coils for extracting power from a magnetic field, or one or more capacitive electrodes for extracting power for extracting power from an electric field; and
   an alignment device for aligning the receiver with a transmitter of a wireless power transfer system, the alignment device comprising:
   a coil configured to generate an induced voltage from the magnetic field, or an electrode configured to generate an induced voltage from the electric field, the coil or electrode forming part of a field detection unit (FDU); and
   a comparator configured to compare the induced voltage to a threshold voltage and activate an indicator based on the comparison,
   wherein the alignment device comprises a plurality of FDUs, each FDU comprising an individual coil configured to generate an induced voltage from a magnetic field, or an individual electrode configured to generate an induced voltage from an electric field, and
wherein each FDU is identical.

\* \* \* \* \*